US008589261B2

(12) United States Patent
Hardison, III

(10) Patent No.: US 8,589,261 B2
(45) Date of Patent: *Nov. 19, 2013

(54) SYSTEM FOR IMPLEMENTING A SECURITY ISSUER RIGHTS MANAGEMENT PROCESS OVER A DISTRIBUTED COMMUNICATIONS NETWORK DEPLOYED IN A FINANCIAL MARKETPLACE

(75) Inventor: Joseph H. Hardison, III, Darien, CT (US)

(73) Assignee: Interest Capturing Systems, LLC, Darien, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,886

(22) Filed: Jun. 10, 2012

(65) Prior Publication Data
US 2012/0254069 A1  Oct. 4, 2012

Related U.S. Application Data

(63) Continuation of application No. 12/456,135, filed on Jun. 11, 2009, now Pat. No. 8,255,296.

(51) Int. Cl.
G07B 17/00 (2006.01)
(52) U.S. Cl.
USPC .............................................. 705/30; 705/39
(58) Field of Classification Search
USPC .......................................................... 705/30
See application file for complete search history.

(56) References Cited

U.S. PATENT DOCUMENTS 4,507,745 A  3/1985  Agrawal
4,751,640 A  6/1988  Lucas et al.
5,082,275 A  1/1992  Nilssen
5,297,026 A  3/1994  Hoffman
5,794,234 A  8/1998  Church et al.
5,832,461 A  11/1998  Leon et al.
5,839,118 A  11/1998  Ryan et al.
5,852,811 A  12/1998  Atkins
5,892,900 A  4/1999  Ginter et al.
5,911,135 A  6/1999  Atkins
5,924,082 A  7/1999  Silverman et al.
5,933,817 A  8/1999  Hucal
5,943,422 A  8/1999  Van Wie et al.
5,991,876 A  11/1999  Johnson et al.
6,006,332 A  12/1999  Rabne et al.
6,021,397 A  2/2000  Jones et al.

(Continued)

FOREIGN PATENT DOCUMENTS

WO  2007081936 A  7/2007

OTHER PUBLICATIONS

"Community Banker", Jan. 2005 by Feig, Nancy.*

(Continued)

*Primary Examiner* — Garcia Ade
(74) *Attorney, Agent, or Firm* — Thomas J. Perkowski, Esq, P.C.

(57) ABSTRACT

A computer-network implemented system recognizes that (i) the security issuer retains (i.e. withholds) the right to lend a debt or equity security prior to security issuance, and (ii) the system allows security borrowers to request from the security issuers, through the system, the right to borrow the non-borrowable security from the security issuer, according to borrowing/lending rates and time periods set by the security issuer with the system, so that (iii) security borrowers can then acquire the right to lend the non-borrowable security from the security issuer, and thereafter, (iv) security borrowers can sell the non-borrowable security short in the financial marketplace and profit from a short sale, without adversely effecting the security issuer.

30 Claims, 27 Drawing Sheets

(56) References Cited

U.S. PATENT DOCUMENTS

| | | | |
|---|---|---|---|
| 6,049,782 A | 4/2000 | Gottesman et al. |
| 6,112,181 A | 8/2000 | Shear et al. |
| 6,112,189 A | 8/2000 | Rickard et al. |
| 6,157,920 A | 12/2000 | Jakobsson et al. |
| 6,192,405 B1 | 2/2001 | Bunnell |
| 6,233,566 B1 | 5/2001 | Levine et al. |
| 6,240,185 B1 | 5/2001 | Van Wie et al. |
| 6,240,399 B1 | 5/2001 | Frank et al. |
| 6,304,860 B1 | 10/2001 | Martin, Jr. et al. |
| 6,324,525 B1 | 11/2001 | Kramer et al. |
| 6,327,652 B1 | 12/2001 | England et al. |
| 6,330,670 B1 | 12/2001 | England et al. |
| 6,449,367 B2 | 9/2002 | Van Wie et al. |
| 6,460,082 B1 | 10/2002 | Lumelsky et al. |
| 6,609,113 B1 | 8/2003 | O'Leary et al. |
| 6,618,484 B1 | 9/2003 | Van Wie et al. |
| 6,618,808 B1 | 9/2003 | Johnson et al. |
| 6,658,568 B1 | 12/2003 | Ginter et al. |
| 6,769,032 B1 | 7/2004 | Katiyar et al. |
| 6,795,922 B2 | 9/2004 | Johnson et al. |
| 6,850,252 B1 | 2/2005 | Hoffberg |
| 6,859,880 B2 | 2/2005 | Johnson et al. |
| 6,868,408 B1 | 3/2005 | Rosen |
| 6,904,432 B2 | 6/2005 | Charlot et al. |
| 6,968,996 B2 | 11/2005 | Reddy et al. |
| 6,993,508 B1 | 1/2006 | Major et al. |
| 7,073,199 B1 | 7/2006 | Raley |
| 7,092,914 B1 | 8/2006 | Shear et al. |
| 7,092,953 B1 | 8/2006 | Haynes |
| 7,099,849 B1 | 8/2006 | Reeder et al. |
| 7,110,983 B2 | 9/2006 | Shear et al. |
| 7,124,302 B2 | 10/2006 | Ginter et al. |
| 7,130,829 B2 | 10/2006 | Banerjee et al. |
| 7,143,006 B2 * | 11/2006 | Ma et al. ............... 702/179 |
| 7,143,066 B2 | 11/2006 | Shear et al. |
| 7,181,424 B1 | 2/2007 | Ketchum et al. |
| 7,194,092 B1 | 3/2007 | England et al. |
| 7,209,892 B1 | 4/2007 | Galuten et al. |
| 7,237,125 B2 | 6/2007 | Raley et al. |
| 7,240,196 B2 | 7/2007 | Cooper et al. |
| 7,246,092 B1 | 7/2007 | Peterson et al. |
| 7,249,086 B2 | 7/2007 | Bloom et al. |
| 7,281,274 B2 | 10/2007 | Manning et al. |
| 7,290,699 B2 | 11/2007 | Reddy et al. |
| 7,302,483 B1 | 11/2007 | Carbone et al. |
| 7,308,717 B2 | 12/2007 | Koved et al. |
| 7,310,616 B2 | 12/2007 | Sugahara |
| 7,310,620 B2 | 12/2007 | Moore et al. |
| 7,310,729 B2 | 12/2007 | Gordon et al. |
| 7,313,814 B2 | 12/2007 | Zhu et al. |
| 7,359,877 B2 | 4/2008 | Malitzis et al. |
| 7,360,030 B1 | 4/2008 | Georgiev |
| 7,360,098 B2 | 4/2008 | Johnson et al. |
| 7,386,514 B2 | 6/2008 | Major et al. |
| 7,389,273 B2 | 6/2008 | Irwin et al. |
| 7,406,444 B2 | 7/2008 | Eng et al. |
| 7,406,447 B2 | 7/2008 | Moore et al. |
| 7,436,958 B2 | 10/2008 | Ji et al. |
| 7,454,372 B1 | 11/2008 | Anaya et al. |
| 7,523,062 B2 | 4/2009 | Moore et al. |
| 7,526,445 B2 | 4/2009 | Macqueen et al. |
| 7,571,130 B2 | 8/2009 | Weber et al. |
| 7,574,399 B2 | 8/2009 | Weber et al. |
| 7,587,346 B2 | 9/2009 | Malitzis |
| 7,647,264 B2 | 1/2010 | Hatheway et al. |
| 7,680,725 B2 | 3/2010 | Bloom et al. |
| 7,698,193 B2 | 4/2010 | Davin, III et al. |
| 7,742,969 B2 | 6/2010 | Teague et al. |
| 7,747,506 B2 | 6/2010 | Alexander et al. |
| 7,747,512 B2 | 6/2010 | Gastineau et al. |
| 7,747,513 B2 | 6/2010 | Duquette et al. |
| 7,752,116 B2 | 7/2010 | Ascher et al. |
| 7,769,674 B2 | 8/2010 | Bloom |
| 7,778,917 B2 | 8/2010 | Bloom |
| 7,792,737 B2 | 9/2010 | Bloom |
| 7,797,221 B2 | 9/2010 | Kokis et al. |
| 7,801,795 B2 | 9/2010 | Nunes et al. |
| 7,809,627 B2 | 10/2010 | Bloom et al. |
| 7,813,992 B2 | 10/2010 | Bloom et al. |
| 7,814,001 B2 | 10/2010 | Weber et al. |
| 7,822,678 B2 | 10/2010 | Weber et al. |
| 7,827,094 B2 | 11/2010 | Bloom |
| 7,870,056 B2 | 1/2011 | Ketchum et al. |
| 7,882,010 B2 | 2/2011 | Moore et al. |
| 7,890,411 B2 | 2/2011 | Moore et al. |
| 7,895,112 B2 | 2/2011 | Richmann et al. |
| 7,917,429 B2 | 3/2011 | Weber et al. |
| 7,921,051 B2 | 4/2011 | Serkin et al. |
| 7,925,570 B2 | 4/2011 | Hatheway et al. |
| 7,933,827 B2 | 4/2011 | Richmann et al. |
| 7,962,399 B2 | 6/2011 | Martyn et al. |
| 7,970,687 B2 | 6/2011 | Gastineau et al. |
| 7,974,907 B2 | 7/2011 | Miller et al. |
| 7,979,336 B2 | 7/2011 | Weber et al. |
| 7,983,983 B2 | 7/2011 | Bloom et al. |
| 7,983,985 B2 | 7/2011 | Bloom et al. |
| 8,015,098 B2 | 9/2011 | Courbois et al. |
| 8,024,258 B2 | 9/2011 | Gastineau et al. |
| 8,027,911 B2 | 9/2011 | Weber et al. |
| 8,046,291 B2 | 10/2011 | Bloom |
| 8,069,110 B2 | 11/2011 | Cottrell |
| 8,090,640 B2 | 1/2012 | Nalbandian et al. |
| 8,095,453 B2 | 1/2012 | Hughes, Jr. et al. |
| 8,099,353 B2 | 1/2012 | Teague et al. |
| 8,255,296 B2 | 8/2012 | Hardison, III |
| 2002/0013767 A1 | 1/2002 | Katz |
| 2002/0022966 A1 | 2/2002 | Horgan |
| 2002/0046144 A1 | 4/2002 | Graff |
| 2002/0087461 A1 | 7/2002 | Ganesan et al. |
| 2002/0116331 A1 | 8/2002 | Cataline et al. |
| 2002/0185529 A1 | 12/2002 | Cooper et al. |
| 2002/0198833 A1 | 12/2002 | Wohlstadter |
| 2003/0018563 A1 | 1/2003 | Kilgour et al. |
| 2003/0018694 A1 | 1/2003 | Chen et al. |
| 2003/0070080 A1 | 4/2003 | Rosen |
| 2003/0091635 A1 | 5/2003 | Baichwal et al. |
| 2003/0097331 A1 | 5/2003 | Cohen |
| 2003/0105688 A1 | 6/2003 | Brown et al. |
| 2003/0140003 A1 * | 7/2003 | Wang et al. ............... 705/39 |
| 2003/0212641 A1 | 11/2003 | Johnson |
| 2003/0216990 A1 * | 11/2003 | Star ........................ 705/35 |
| 2003/0225688 A1 | 12/2003 | Dobbins |
| 2003/0236726 A1 | 12/2003 | Almonte et al. |
| 2004/0044632 A1 | 3/2004 | Onn et al. |
| 2004/0153403 A1 | 8/2004 | Sadre |
| 2005/0080705 A1 | 4/2005 | Chaganti |
| 2005/0097017 A1 | 5/2005 | Hanratty |
| 2005/0125323 A1 * | 6/2005 | Warren ...................... 705/35 |
| 2005/0125332 A1 | 6/2005 | Cliff |
| 2006/0031154 A1 | 2/2006 | Noviello et al. |
| 2006/0089895 A1 | 4/2006 | Joye et al. |
| 2006/0271461 A1 | 11/2006 | Chorna et al. |
| 2007/0055594 A1 | 3/2007 | Rivest et al. |
| 2007/0233590 A1 | 10/2007 | Hardison |
| 2009/0030853 A1 | 1/2009 | De La Motte |
| 2010/0094746 A1 | 4/2010 | Macgregor et al. |
| 2010/0100500 A1 | 4/2010 | Nunes et al. |
| 2010/0198745 A1 | 8/2010 | Davin, III et al. |
| 2010/0205109 A1 | 8/2010 | Hatheway et al. |
| 2010/0262529 A1 | 10/2010 | Bloom et al. |
| 2010/0262531 A1 | 10/2010 | Teague et al. |
| 2010/0318445 A1 | 12/2010 | Hardison, III |
| 2011/0022511 A1 | 1/2011 | Bloom et al. |
| 2011/0029455 A1 | 2/2011 | Weber et al. |
| 2011/0040676 A1 | 2/2011 | Hughes, Jr. et al. |
| 2011/0055112 A1 | 3/2011 | Haines et al. |
| 2011/0066541 A1 | 3/2011 | Hatheway et al. |
| 2011/0137825 A1 | 6/2011 | Weber et al. |
| 2011/0219078 A1 | 9/2011 | Beresford-Wood et al. |
| 2012/0005063 A1 | 1/2012 | Moitoso et al. |
| 2012/0011046 A1 | 1/2012 | Nalbandian et al. |

(56) References Cited

OTHER PUBLICATIONS

Bunge, J. "Exchanges Try to Limit Shorts Ban", Wall Street Journal, pp. C3, (Mar. 25, 2009).
Cheng, J. "Global Stock Cops Look to Rein in Shorts", Wall Street Journal, p. C2, (Mar. 24, 2009).
Feig, Nancy, "Payroll Cards", Community Banker, pp. 1-2, (Jan. 2005).
Goldwasser, Joan, "Sweep Yields can Make You Weep", Kiplinger's Personal Finance, pp. 1, (May 2005).
Hu, H. "Empty Creditors' and the Crisis" , Wall Street Journal, pp. A13, (Apr. 10, 2009).
International Search Report for PCT/US2007/000500 completed Nov. 13, 2007.
International Search Report for PCT/US2010/038101 completed Sep. 28, 2010.
J.E. Penner. The "Bundle of Rights" Picture of Property. Lexis Nexis. Copyright (c) The Regents of the University of California 1996. UCLA Law Review. Feb. 1996. 43 UCLA L. Rev. 711. 50,790 words. 74 pages.
Kessler, A. "Have We Seen the Last on the Bear Raids?", Wall Street Journal, pp. A13, (Mar. 26, 2009).
Kim, Jane J., "Wall Street Cuts Yields on Investors' Cash", Wall Street Journal, pp. D1 and D3, (Aug. 31, 2005).
Lucchetti, Aaron, "Investors Get Shortchanged on Interest", Wall Street Journal, pp. D1-D2, Feb. 17, 2005).
Martinez, A. "New Idiom: March Came in like a Bear", Wall Street Journal, pp. C7, (Mar. 25, 2009).
Nakamichi, T. "Naked' Ban is Extended by Japan", Wall Street Journal, pp. C2, (Mar. 25, 2009).
Patterson, S. and Ackerman, A. "SEC May Ticket Speeding Traders", Wall Street Journal, Feb. 23, 2012, 3 pages.
Reply to Written Opinion in International Patent Application No. PCT/2010/038101 dated Jan. 4, 2011.
Scannell, K. "Naked Short Sales Provoke Complaints but No Cases", Wall Street Journal, (Mar. 19, 2009).
Scannell, K. "Wrangling Ahead on Short-Sale Plans" , Wall Street Journal, pp. C1, (Apr. 9, 2009).
Soros, G. "One Way to Stop Bear Raids", Wall Street Journal, pp. A17, (Mar. 24, 2009).
Tracy, T. "New Short Stats Speak Volumes. That's It" , Wall Street Journal, pp. C5, (Sep. 17, 2009).
Zweig, J. "Is Your Fund Pawning Shares at Your Expense?", Wall Street Journal, pp. B1, (May 30, 2009).

\* cited by examiner

Traditional Equity Rights Possessed by an Owner and/or Holder of Equity Securities

1) Ownership Right – right to corporation's gains/losses commensurate with ownership interest
2) Voting Right – right to vote on corporate issues
3) Transfer Right – right to sell ownership interest via an exchange (liquidity)
4) Dividend Right – right to dividends distributed by corporation
5) Inspection Right – right to inspect corporation's books and records
6) Legal Right – right to sue corporation for wrongful/illegal acts
7) Shareholder Right – right to discounts on corporation's goods and Services (corporation specific)
8) Liquidation Right – right to share in proceeds of corporate liquidation
9) Collateral Right – right to use equity holding as collateral for margin, and other, loans and purposes
10) Lending Right – right to lend equity share(s) to short-sellers and others
11) Liability Right – right to limited liability FIG. 2A
(Prior Art)

Traditional Debt Rights Possessed by an Owner and/or Holder of Corporate or Government Debt

1) Redemption Right – right to redeem bond at maturity or bankruptcy
2) Income Right – right to stream of income per contract
3) Seniority Right – seniority over equity holders in liquidation/bankruptcy
4) Security Right – right to be paid out of corporate/government assets
5) Covenant Right – right to impose contractual covenants
6) Collateral Right – right to use debt securities as collateral
7) Lending Right – right to lend debt securities to short-sellers and others
8) Legal Right – right to sue corporation/government for wrongful/illegal acts
9) Transfer Right – right to sell debt ownership interest FIG. 2B
(Prior Art)

Recognition of the Set of Individual, Separable, and Combinable Rights Possessed by an Issuer of Equity Securities, Prior to Issuance, that Can Be Granted in Accordance with the Principles of the Present Invention

Equity Security Issuer Rights

1) Right of Equity Ownership = ER ($\alpha$, \$)
2) Right to Vote Equity Interest = ER ($\beta$, \$)
3) Right to Transfer Equity Interest = ER ($\gamma$, \$)
4) Right to Equity Interest Dividends = ER ($\delta$, \$)
5) Right to Inspect Corporate Books = ER ($\epsilon$, \$)
6) Right to Legal Protection from Corporate Fraud/Malfeasance = ER ($\zeta$, \$)
7) Right to Equity Holder Privileges = ER ($\eta$, \$)
8) Right to Corporate Liquidation Proceeds = ER ($\theta$, \$)
9) Right to Use Equity Interest as Collateral = ER ($\iota$, \$)
10) Right to Lend Equity Interest = ER ($\kappa$, \$)
11) Right of Limited Liability = ER ($\lambda$, \$)

(U.S. Dollar-Based System)

Thus, the entire set of rights possessed, and grantable, by an issuer of corporate (or other) securities (equity (\$)) in the U.S. can be represented as follows:

$\{ER (\alpha...\lambda, \$)\}$ = $\{ER (\alpha, \$), ER (\beta, \$), ER (\gamma, \$), ER (\delta, \$), ER (\epsilon, \$),$
$ER (\zeta, \$), ER (\eta, \$), ER (\theta, \$), ER (\iota, \$), ER (\kappa, \$),$
$ER (\lambda, \$)\}$ Similarly, the entire set of rights possessed, and grantable, by an issuer of corporate (or other) securities (equity (GBP)) in the United Kingdom (U.K.) can be represented as follows:

$\{ER (\alpha...\lambda, GBP)\}$ = $\{ER (\alpha, GBP), ER (\beta, GBP), ER (\gamma, GBP),$
$ER (\delta, GBP), ER (\epsilon, GBP), ER (\zeta, GBP),$
$ER (\eta, GBP), ER (\theta, GBP), ER (\iota, GBP),$
$ER (\kappa, GBP), ER (\lambda, GBP)\}$

FIG. 3A

Recognition of the Set of Individual, Separable, and Combinable Rights Possessed by an Issuer of Debt Securities, Prior to Issuance, that Can Be Granted in Accordance with the Principles of the Present Invention

Debt Security Issuer Rights

1) Right of Redemption = DR ($\alpha$, $)
2) Right to Income Stream = DR ($\beta$, $)
3) Right to Seniority = DR ($\gamma$, $)
4) Right to Security = DR ($\delta$, $)
5) Right to Covenants = DR ($\varepsilon$, $)
6) Right to Use Debt Interest as Collateral = DR ($\zeta$, $)
7) Right to Lend Debt Interest = DR ($\eta$, $)
8) Right to Legal Recourse = DR ($\theta$, $)
9) Right to Transfer Debt Interest = DR ($\iota$, $)

(U.S. Dollar-Based System)

---

Thus, the entire set of rights possessed, and grantable, by an issuer of a debt security (corporate, government, other, ($)) in the U.S. can be represented as follows:

{DR ($\alpha$...$\iota$, $)} = {DR ($\alpha$, $), DR ($\beta$, $), DR ($\gamma$, $), DR ($\delta$, $), DR ($\varepsilon$, $), DR ($\zeta$ $), DR ($\eta$, $), DR ($\theta$, $), DR ($\iota$, $)}

---

Similarly, the entire set of rights possessed, and grantable, by an issuer of a debt security (corporate, government, other (GBP)) in the United Kingdom (U.K.) can be represented as follows:

{DR ($\alpha$...$\iota$, GBP)} = {DR ($\alpha$, GBP), DR ($\beta$, GBP), DR ($\gamma$, GBP), DR ($\delta$, GBP), DR ($\varepsilon$, GBP), DR ($\zeta$, GBP), DR ($\eta$, GBP), DR ($\theta$, GBP), DR ($\iota$, GBP)}

FIG. 3B

Security Issuer Rights Management Process (SIRMP) of the Present Invention

Implementation of the Security Issuer Rights Management Process (SIRMP) (Equity) of the Present Invention

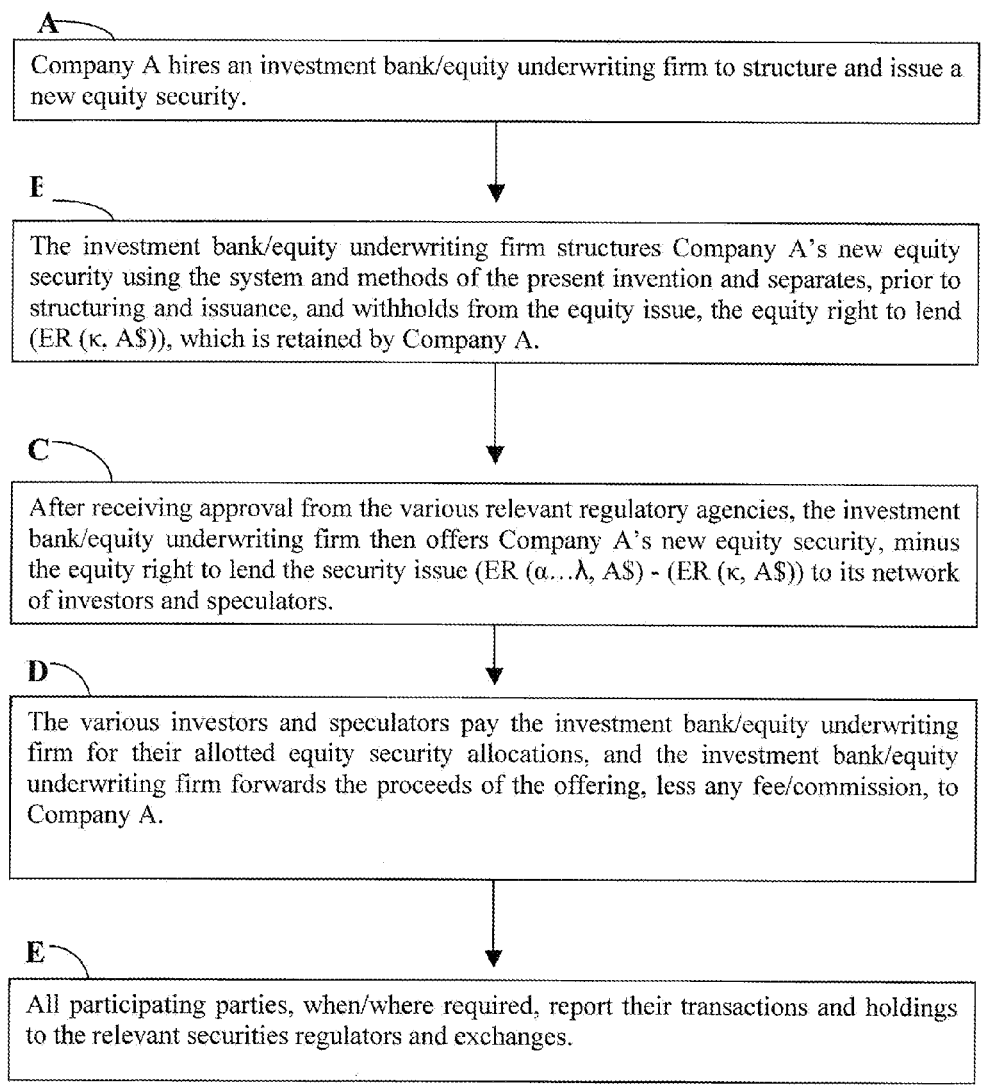

A
Company A hires an investment bank/equity underwriting firm to structure and issue a new equity security.

B
The investment bank/equity underwriting firm structures Company A's new equity security using the system and methods of the present invention and separates, prior to structuring and issuance, and withholds from the equity issue, the equity right to lend (ER (κ, A$)), which is retained by Company A.

C
After receiving approval from the various relevant regulatory agencies, the investment bank/equity underwriting firm then offers Company A's new equity security, minus the equity right to lend the security issue (ER (α...λ, A$) - (ER (κ, A$)) to its network of investors and speculators.

D
The various investors and speculators pay the investment bank/equity underwriting firm for their allotted equity security allocations, and the investment bank/equity underwriting firm forwards the proceeds of the offering, less any fee/commission, to Company A.

E
All participating parties, when/where required, report their transactions and holdings to the relevant securities regulators and exchanges.

FIG. 6C

Non-borrowable (Non-Shortable) Equity and/or Debt Security Exchange and Network of the Present Invention

A
Companies that have issued or converted their existing securities into non-shortable/non-borrowable equity or debt securities via the SIRMP of the present invention, list their securities on the Long-Only Security Exchange.

B
Investment Institutions and Entities then purchase the non-shortable/non-borrowable listed equity and/or debt securities via a brokerage firm that holds member status on the Long-Only Security Exchange.

C
Investment Entities and Institutions, along with the brokerage firm(s), report all pertinent transactions on the Long-Only Security Exchange to the proper Regulatory Agencies.

FIG. 8C

SIRM Network Security Conversion Process

A

A company (JPM in this example) hires an investment bank/underwriting firm to restructure its existing, outstanding equity and/or debt security/securities.

B

The investment bank/underwriting firm restructures JPM's existing, outstanding equity and/or debt securities using the system and methods of the present invention (SIRMP), withholding from the set of equity rights of the restructured equity security the equity right to lend (ER (κ, JPM$)) and/or withholding from the set of debt rights of the restructured debt security the debt right to lend (DR (η, JPM$)), with the right(s) to lend the JPM security/securities being retained by JPM.

C

After restructuring the new JPM equity and/or debt securities, the investment bank/underwriting firm either returns the new equity/debt securities, less the equity and/or debt right(s) to lend ((ER (κ, JPM$)), (DR (η, JPM$)), to the original owners/holders or, to the company in the case of treasury stock/debt, etc. The owners/holders now have JPM stock/debt with the following equity/debt rights: (ER (α...λ, JPM$)) - (ER (κ, JPM$)) for equity securities, and (DR (α...ι, JPM$)) - (DR (η, JPM$)) for debt securities.

D

All participating parties, when/where required, report their transactions and holdings to the relevant securities regulators and exchanges.

FIG. 9C

SIRM Network Corporate/Government Controlled Rights Management Exchange

A

A company (JPM in this example) has either withheld the right(s) to lend its equity (ER ($\kappa$, JPM$)) or debt (DR ($\eta$, JPM$)) at issuance, or has converted its securities to withhold those rights, so that it holds the equity and/or the debt rights to lend its securities.

B

Via the SIRM Network, JPM sets rates for investors, speculators, hedgers, brokerage firms, and others to lease the withheld rights at rates that seek to optimize the profit to JPM. The rate schedule may be set to escalate with increasing interest to short its equity or debt. JPM also can set limits on the amount of rights it offers to shorts and for the time that shorts may hold these rights by requiring the shorts to re-lease the right(s) to lend on a periodic basis. JPM controls the entire shorting process by setting the rates, amounts, and time periods that shorts may short its equity and debt securities. JPM can also specify different lease rates, amounts and periods based on the type of short-seller and can exclude certain classes of short-sellers.

C

The various investors, speculators, hedgers, and others express their interest to short JPM's securities (equity or debt) via the SIRM Network, thus assuring that the short-sellers maintain anonymity from JPM. The short-seller(s) then remit payment for leasing the right(s) to lend the JPM equity or debt securities to the SIRM Network based on the aforementioned fee schedule determined by JPM.

D

The SIRM Network remits payment for the equity and debt right(s) back to JPM and reports, as required, all transactions to the proper regulatory authorities

FIG. 10C

SYSTEM FOR IMPLEMENTING A SECURITY ISSUER RIGHTS MANAGEMENT PROCESS OVER A DISTRIBUTED COMMUNICATIONS NETWORK DEPLOYED IN A FINANCIAL MARKETPLACE

RELATED CASES

The present application is a Continuation of U.S. application Ser. No. 12/456,135 filed Jun. 11, 2009 now U.S. Pat. No. 8,255,296, and commonly owned by Interest Capturing Systems, LLC, and incorporated herein by reference as if set forth in its entirety.

BACKGROUND OF INVENTION

1. Technical Field

The present invention relates to a method of, and system for, enabling companies issuing both equity and debt, and governments and government agencies issuing debt, to exercise the rights they possess as issuers of equity and debt in order to manage and optimize the utility and value of their offerings and holdings in the global financial marketplace.

2. Brief Description of the Prior Art

In conventional securities issuance, as set forth in FIG. 1 of the Drawings, the issuing company or government enlists the aid of an investment bank in order, first, to structure the equity or debt offering and second, to underwrite/distribute the offering to purchasers. The investment bank then returns the proceeds, less applicable fees, from the equity/debt sale to the issuing company or government.

Issuers of equity and debt have many options from which to choose when trying to raise money. Typically, a company can issue common or preferred stock (equity), or a company or government can issue different types of debt, with the primary differentiators being the terms (contract) under which the debt is issued, and the tax treatment of periodic interest payments.

Companies (equity and debt) and governments (debt) try to issue equity and debt under conditions most favorable to themselves while, at the same time, they try to sate the appetites of investors so that equity and debt offerings are fully subscribed, in order to allow the company or government to raise the full amount of money required/sought.

One of the problems that many companies, governments and, ultimately, investors in the companies' and governments' equity and debt, encounter is that of short-selling, through which, investors and speculators borrow a company's or government's equity and/or debt from the owner or holder (fiduciary) and sell it in the market hoping to buy it back at a lower price and make a profit. Short-selling puts downward pressure on a company's shares and/or debt, or on a government's debt, which can have several harmful effects. First, as the price of a security falls, it can force long-term holders, who have been loyal to the company or government, to sell their securities to avoid a loss, which then adds to the selling pressure on a company's or government's securities and drives their price(s) lower. More importantly, as has been illustrated in this latest credit crisis, pressure from short-sellers can both raise the price to a company or government of raising capital via debt sales, and it can create excessive shareholder dilution when a company is forced to raise capital by selling more shares at lower prices.

However, short-selling has several functions. It allows investors with exposure to a company's equity and/or debt, and/or to a government's debt, to hedge their exposure by having an offsetting position in either the underlying equity or debt instrument or through a derivative instrument; in the event the hedge is in the form of a derivative instrument, the seller of that derivative instrument usually has to sell short a company's equity/debt or, if a government-based derivative, the government's debt, in order to hedge the derivative seller's downside exposure. Short-selling is also employed by speculators (hedge funds, bank trading desks, individuals, etc.) to make a direct bet against the underlying equity or debt of a company or government.

The advent of more sophisticated derivatives like credit default swaps (CDS's), levered exchange-traded funds (ETF's), and other exotic derivatives, along with the proliferation of hedge funds and other speculative interests, have combined to allow speculators and hedgers to put undue and intentional selling pressure on the equity and/or debt of a company or on the debt of government entities. A great example of this is the credit default swap market, which was started to allow lenders to hedge against the debt of companies to which they were lending. Today, the credit default swap market has underlying, issued debt totaling approximately $2 trillion, but the outstanding credit default swaps in existence total approximately $50 trillion.

An example of the unintended consequences of allowing investors, speculators and others to participate in these massively leveraged short sales is the collapse in 2008 of Bear Stearns, which was ultimately sold to JP Morgan Chase in a forced sale by the U.S. government. The Thursday before the weekend collapse of Bear Stearns, the CEO went on national television to proclaim that Bear Stearns had in excess of $17 billion of capital and that it would weather the growing financial crisis. However, massive short sales of the company's stock, combined with large buying of low-delta (out-of-the-money) put options and credit default swaps, made Bear Stearns appear to be on shaky financial ground. This, in turn, prompted those holding Bear Stearns' stock and debt to sell, which exerted additional downward pressure on the company's outstanding equity and debt. Customers of Bear Stearns, unnerved by the company's rapidly collapsing stock and bond issues, moved quickly to pull their funds on deposit with Bear Stearns, and the company quickly ran short of capital prompting government intervention. Without the use of large short sales and the aforementioned highly leveraged derivative instruments, which allowed speculators and others to cause massive selling of the underlying stock and bond issues as they were sold by the sellers of the derivatives instruments in order to hedge their exposures, Bear Stearns might have survived as an independent, ongoing entity.

Another problem caused by massive short-selling of a company's equity and/or debt, and of a government's debt, is that the further the prices of equity and/or debt are depressed by short-selling, the harder, more expensive, and more dilutive it becomes for a company or government to raise additional capital through additional debt or equity sales. Excessive selling pressure, via short sales and derivative instruments, on corporate or government debt, as has happened in this most recent financial crisis, can influence and/or cause rating agencies to downgrade a company's or government's financial ratings, thereby increasing the cost of raising additional capital via debt sales. Similarly, excessive downward pressure, via short sales and derivative instruments, on a company's stock can depress the stock to extremely low levels making additional equity sales highly dilutive to existing shareholders. In extreme cases, this pressure on a company's stock can make it virtually impossible to raise new capital via equity sales because of the dilutive effects.

Another problem associated with short-selling is that of naked short-selling, wherein a speculator or investor sells short a company's equity and/or debt or a government's debt without first sourcing the equity or debt to deliver against the short-sale. In naked short-selling, a speculator or investor sells short a company's equity or debt, or a government's debt, and then has a certain amount of time to find/borrow the shares or debt to deliver against the established short position. Naked short-selling, while illegal, is rarely prosecuted, as most of the time speculators and investors are able to find the equity or debt to deliver against their pre-established short position(s). Nevertheless, naked short-selling allows speculators to sell huge quantities of a company's equity or debt, or a government's debt, creating unnecessary downward price pressure on those instruments.

Securities lending is another business that fosters short-selling. "Securities lending is an over-the-counter market, so the size of this industry is difficult to estimate accurately. According to the industry group ISLA, in the year 2007, the balance of securities on loan exceeds $2 trillion globally.

The principal reason for borrowing a security is to cover a short position. Securities lending & borrowing is often required, by matter of law, to engage in short selling." (Source Wikipedia)

Recently, there have been several attempts, all regulatory, to address the problems associated with and/or caused by short-selling. The Securities and Exchange Commission (SEC) imposed a temporary ban on short sales against financial institutions in an effort to ease the pressure on their equity and debt. The SEC also came out and reaffirmed the illegality of naked short sales. Various other remedies have been proposed, including: having hedge funds register with the SEC and reveal their positions; easing of mark-to-market accounting rules, which have exerted extreme valuation pressure on banks' balance sheets; further regulation of the CDS market (presently, there are several exchanges proposed that would better organize this market and require participants to post margin); and other proposed rules and regulations that all aim at imposing additional regulatory oversight in these various markets, on the various underlying equity, debt and their derivatives, and on speculators and investors that participate in these markets/instruments.

Many recent articles have highlighted the problems short-selling has created in the financial markets: "Naked Short Sales Provoke Complaints but No Cases" (The Wall Street Journal, Mar. 19, 2009), "One Way to Stop Bear Raids" (The Wall Street Journal, Mar. 24, 2009), "Global Stock Cops Look to Rein In Shorts" (The Wall Street Journal, Mar. 24, 2009), "Short Selling—New Idiom: March Came in Like a Bear" (The Wall Street Journal, Mar. 25, 2009), "Exchanges Try to Limit Shorts Ban" (The Wall Street Journal, Mar. 25, 2009), "'Naked' Ban Is Extended By Japan" (The Wall Street Journal, Mar. 25, 2009), "Have We Seen the Last of the Bear Raids" (The Wall Street Journal, Mar. 26, 2009) "Wrangling Ahead on Short-Sale Plans" (The Wall Street Journal, Apr. 9, 2009), "'Empty Creditors' and the Crisis" (The Wall Street Journal, (Apr. 10, 2009) to name a few of the most recent. However, as all of the articles make clear, short-selling is a very hard process to manage and regulate, as many speculators, investors and, even hedgers, are not required to report various positions across all equity, debt and derivative instruments. The use of leverage by market participants further exacerbates the negative effects of short-selling.

As illustrated above, short-selling has become a huge problem in today's capital markets, as it can increase a company's or government's borrowing costs and can cause excessive dilution via new equity issuance. It also can increase volatility in a company's or government's securities, which can force longer-term security holders to sell their securities to avoid a loss. Every proposal to address the problems associated with short-selling, to date, has been regulatory in nature. What is needed is a market-based solution that allows security issuers to manage short-selling in their securities.

Also known in the prior art is the ability of market practitioners to unbundle various sets of rights associated with issued securities in order to derive added benefit from the individual rights associated with issued securities (equity and debt). As an example, a hedge fund may purchase a large block of stock in a company in order to exercise the voting rights associated with those shares for/against management's proposals and, at the same time, buy downside derivative protection in the form of equity put options (or other equity derivatives) on those shares to hedge against any downside move in the stock. This strategy has effectively allowed the hedge fund to gain control of a voting interest (voting rights) in the company without economic exposure should the stock it is holding move lower (in fact, the hedge fund can gain the voting interest (voting rights) and profit if the stock moves lower via this arrangement).

Similarly, an investor may hold an equity or debt security and pledge the income stream (right to dividend payments (equity) or right coupon payments (debt)) toward a charity, educational entity or trust. Effectively, the investor has unbundled an equity or debt right from the sets of rights that accompany issued equity and/or debt.

U.S. Publication No. 20050125323 to Warren, U.S. Publication No. 20020198833 to Wohlstadter, U.S. Publication No. 20050080705 to Chaganti, and U.S. Pat. No. 7,310,616 to Sugahara all disclose various methods for recognizing and trading various security rights of issued securities. However, each of these prior art references fail to address, either singularly or in combination with each other, the aforementioned problems associated with short-selling of a company's (equity and debt) or a government's (debt) securities, as each still allows a company's or government's issued securities to be shorted—a process over which, the company or government has no control. And, as demonstrated in the aforementioned hedge fund voting right example, it is possible for an investor/speculator to use and manipulate individual security rights to the detriment of the issuing company, government, or other entity.

In view of all of the aforementioned shortcomings, deficiencies and inefficiencies that exist in financial marketplaces, there is a great need in the art for improved systems and methods for solving the problem(s) associated with investors, speculators and/or hedgers putting unwarranted downward pressure on the prices of companies' and governments' equity and debt instruments through short sales and the use of derivative instruments, while avoiding the shortcomings and drawbacks of the prior art apparatus and methodologies heretofore known.

OBJECTS AND SUMMARY OF THE PRESENT INVENTION

Accordingly, it is a primary object of the present invention to provide a method of, and system for, solving the inefficiencies of prior art security structuring and issuing/offering methods, while avoiding the shortcomings and drawbacks of the prior art apparatus and methodologies.

Another object of the present invention is to provide a method and system which inherently recognize the separate, withholdable, and transferable rights associated with equity and debt instruments (collectively, securities instruments) issuance, thereby enabling the maximization of economic value that such property can support within the marketplace.

Another object of the present invention is to provide such a method and system, wherein the rights associated with issuing securities (equity, debt and hybrid securities) are automatically unbundled (i.e. individually separated) in such form that each individual right, or subsets of individual rights, can be withheld prior to issuance and then transferred independently of the other rights in an effort to optimize the utility and economic value to the security issuer.

Another object of the present invention is to provide such a method and system wherein the issuers of equity and/or debt securities are afforded the opportunity to freely withhold and transfer certain of the rights they possess as issuers of these securities in order to limit certain other activities they may deem detrimental to their interests as issuers of equity and/or debt securities.

Another object of the present invention is to provide issuers of equity and debt securities with the ability to prevent speculators and other non-investing entities from selling short an issuer's debt or equity securities by allowing the issuer of said securities to withhold the right to lend those securities (ER ($\kappa$, $)) (equity), DR ($\eta$, $)) (debt), in order to prevent them from being lent to short-sellers to sell short.

Another object of the present invention is to provide issuers of equity and debt securities with the ability to prevent investors, speculators and others from using the issuer's equity or debt securities as collateral for borrowing, or other trading and investing activities, by allowing the issuer, owner and/or holder of said securities to withhold the right to post those securities as collateral (ER ($\iota$, $) (equity), DR ($\zeta$, $)) (debt) in order to prevent them from being used as collateral for borrowing, trading or investing.

Another object of the present invention is to provide such a method and system, wherein the sets of rights associated with equity securities {ER ($\alpha$ ... $\lambda$, $)} and debt securities {DR ($\alpha$ ... $\iota$, $)} possessed by an issuer of equity and/or debt securities, are separate and divisible.

Another object of the present invention is to provide such a method and system, wherein the set of rights possessed by issuers of equity, debt and hybrid securities can be utilized in non-mutually exclusive manners.

Another object of the present invention is to allow security issuers to establish pricing for the withheld rights to lend their equity and/or debt securities in order to optimize income associated with leasing or selling the withheld rights to lend its securities, for the benefit of the issuing entity and, thus, its investors.

Another object of the present invention is to allow security issuers to determine how much, if any, of its withheld rights to lend (equity, debt and hybrid) in order to control short-selling of its securities and profit from any short-selling of its securities.

Another object of the present invention is to provide an Internet-based method and system, wherein all participating security issuers feed all security rights information (withheld rights, transferred rights, etc.) directly into a database maintained by the system, for the purpose of allowing the Internet-based system to catalogue and display certain securities rights information to issuers, owners and/or holders of equity, debt and hybrid securities.

Another object of the present invention is to provide such an Internet-based method and system, wherein a process is provided to allow the system to rank various equity, debt and hybrid securities for a system user's benefit via criteria that may differ vastly from that typically employed by a system user.

Another object of the present invention is to provide such an Internet-based method and system, whereby institutional users are provided with a manual and/or automatic means for accessing the universe of securities rights details (details on individual security's rights withholdings, transfers, etc.), thereby ensuring that they fulfill their fiduciary duty to their investors who seek the various qualities/securities rights in the securities they purchase, sell and hold.

Another object of the present invention is to provide such an Internet-based method and system, wherein financial institutions and any entity holding a fiduciary responsibility have the ability to fulfill their obligations to their investors by seeking the best rights terms, thereby reducing potential legal liability associated with the failure to fulfill attendant fiduciary responsibilities and obligations.

Another object of the present invention is to provide such an Internet-based method and system, wherein a system user would still be able to establish one or more important criteria regarding various securities rights and then allow the system to take over and make investment decisions based on the limited criteria provided by a system user.

Another object of the present invention is to provide an Internet-based method and system, wherein security issuers are able to exact higher remuneration from banks or financial institutions for security rights withheld prior to issuance, mainly the rights to lend the issuer's equity and debt securities.

Another object of the present invention is to provide an Internet-based method and system, wherein relational databases automatically receive pricing information from various security issuers for the issuers' equity and debt securities and display the information based on absolute rank and, separately, on the system user's and on the system's preferences.

Another object of the present invention is to provide such an Internet-based method and system, wherein government regulatory agencies can actively monitor all security right(s) withholdings, transfers, sales, leases, and other related transactions.

Another object of the present invention is to provide an Internet-based method and system for representing and accounting for the security rights held by security issuers, and the transfers of such rights among a network of financial institutions, provided by the Internet-based system and method of the present invention.

Another object of the present invention is to provide a transparent "netting" process through which financial institutions settle withheld/transferred security rights amongst themselves.

Another object of the present invention is to provide security issuers of securities already issued and outstanding, with the ability to convert those existing, issued securities into new securities withholding the right(s) to lend their equity and/or debt securities to preclude short-selling of securities already issued. This will allow security issuers to preclude behavior they deem detrimental to their own interests while, at the same time, providing additional security value and protection to their investors.

Another object of the present invention is to provide security issuers (companies, governments, and others) the ability to market various withheld and/or unbundled security (debt, equity and/or hybrid) rights (principally, the right(s) to lend equity and/or debt securities) in order to control and profit from the unlocked value of those rights. For example, a company could withhold the right to lend its shares to short-sellers to preclude short-selling, and the company could then lease that right to lend its securities to short-sellers at rates it deems advantageous to it and to its shareholders.

Another object of the present invention is to provide issuers with the ability to classify their various securities of all types with certain alphanumeric-coded designations to signify that certain securities cannot be lent, used as collateral, sold, or used in any other way that may contravene the issuer's original, included specifications upon issuance.

These and other objects of the present invention will become more apparent from the descriptions and drawings contained herein, and are, by no means, confined or limited by other improvements or advantages that may be realized.

BRIEF DESCRIPTION OF THE DRAWINGS

In order to understand more fully the Objects of the Invention, the following Detailed Description of the Illustrative Embodiments should be read in conjunction with the appended figure drawings, wherein:

FIG. 2A is a schematic representation of the various rights traditionally possessed by owners and/or holders of equity securities;

FIG. 2B is a schematic representation of the various rights traditionally possessed by owners and/or holders of debt securities;

FIG. 3A sets forth a set of equations that formally recognize and describe a broad set of security rights (ER ($\alpha \ldots \lambda$, $)) possessed, and grantable, by an issuer of an equity security prior to issuance, which can be separated and structured into a package of security rights to be issued as an equity security to more perfectly suit an equity issuer's needs, and illustrating that, in accordance with the principles of the present invention, this set of individual rights is divisible and combinable, and each individual right is separately able to be withheld, prior to issuance, or transferred, in a non-mutually exclusive manner, so as to maximize the utility of equity securities to the equity security issuer in the global marketplace, in a manner akin to the bundle of rights possessed through ownership of land, including rights pertaining to minerals, timber, agriculture, surface usage, water usage, air usage, and riparian and development rights, to name the most common individual rights associated with owning and/or holding real property;

FIG. 3B sets forth a set of equations that formally recognize and describe a broad set of security rights (DR ($\alpha \ldots \iota$, $)) possessed, and grantable, by an issuer of a debt security prior to issuance, which can be separated and packaged into a set of security rights to be issued as a debt security to more perfectly suit a debt issuer's needs, in accordance with the principles of the present invention, and illustrating that, in accordance with the principles of the present invention, this set of individual rights is divisible and combinable, and each individual right is separately able to be withheld, prior to issuance, or transferred, in a non-mutually exclusive manner, so as to maximize the utility of debt securities to the debt security issuer in the global marketplace, in a manner akin to the bundle of rights possesses through ownership of land, including rights pertaining to minerals, timber, agriculture, surface usage, water usage, air usage, and riparian and development rights, to name the most common individual rights associated with owning and/or holding real property;

FIG. 6C is a flow chart depicting the various steps carried out during the equity right(s) issuance withholding process of the present invention depicted in FIG. 6B illustrating the withholding and retention by an equity-issuing company, of the equity right to lend (ER ($\kappa$, A$));

FIG. 8C is a flow chart depicting the various steps carried out during the Non-borrowable (non-shortable) Equity and/or Debt Security Exchange and Network of the present invention, shown in FIG. 8;

FIG. 9C is a flow chart depicting the various steps carried out during the Security Conversion Process of the present invention carried out on the SIRM network of FIG. 9;

FIG. 10C is a flow chart depicting the various steps carried out during the Corporate/Government Controlled Rights Management Exchange Process of the present invention supported on the SIRM network of FIG. 10.

DETAILED DESCRIPTION OF THE ILLUSTRATIVE EMBODIMENTS OF THE PRESENT INVENTION

Figure 1:
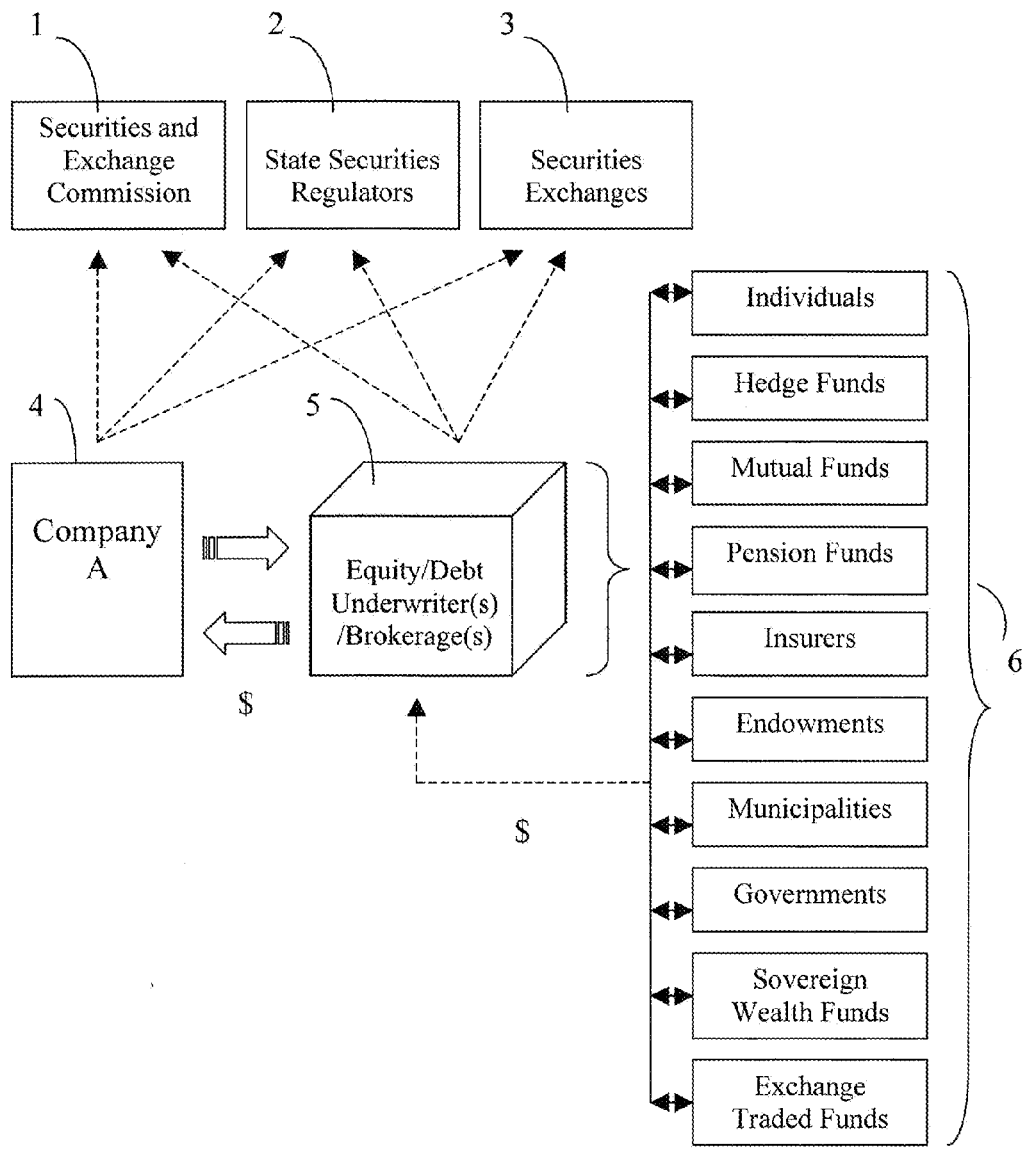
FIG. 1 is a schematic representation illustrating the flow of securities and money from the conventional securities underwriting process, wherein a company utilizes an investment bank or bank to underwrite and distribute equity, debt and hybrid securities to various investor groups, which pay the investment bank and/or bank (underwriter(s)) for the securities; the investment bank or bank then forwards the proceeds from the securities issuance to the company after subtracting the underwriting fees and, typically, the investment bank continues to make a market in said securities and offer brokerage services for the securities.

Referring to the figures in the accompanying Drawings, the illustrative best mode embodiments of the present invention will now be described in greater technical detail, wherein like parts are indicated by like reference numbers.

Overview of the Method of Security Issuer (Equity & Debt) Rights Withholding and Transfer According to the Principles of the Present Invention Referring to FIG. 3A, there is presented an important set of equations that formally recognizes a broad set of security (equity) rights, possessed and grantable by an issuer of equity securities (ER (α . . . λ, $)), prior to a security's issuance. In accordance with the principle of the present invention, this set of security (equity) rights can be separated and structured into a package of security rights to be issued as an equity security to more perfectly suit an equity issuer's needs, thereby allowing certain right(s) to be effectively withheld prior to equity security structuring and issuance by an issuing company or other entity or, which, can be utilized to convert already issued equity securities into non-shortable equity securities in the global financial marketplace in accordance with the principles of the present invention. As will be described in greater detail hereinafter, the withholding of such security rights prior to issuance, or via the conversion process, is carried out using the Equity Issuer Rights Management Process (EIRMP) of the present invention, which recognizes and ensures that the above-identified set of individual equity rights is divisible and combinable prior to equity issuance, and that the individual right to lend equities (ER (κ, $)) is separately withholdable prior to security issuance, enabling a company or other entity to effectively preclude short-selling of its equity securities—a process companies have, heretofore, been unable to stop to their great detriment.

Referring to FIG. 3B, there is presented an important set of equations that formally recognizes a broad set of security (debt) rights (DR ($\alpha \ldots \partial$, $)), possessed and grantable by an issuer, owner and/or holder of debt securities. This set of security (debt) rights can be separated and structured into a package of security rights to be issued as an equity security to more perfectly suit an equity issuer's needs, allowing certain right(s) to be effectively withheld prior to debt security structuring and issuance by an issuing company, government, government agency or other entity, or which can be utilized to convert already issued debt securities into unshortable debt securities in the global financial marketplace, in accordance with the principles of the present invention. As will be described in greater detail hereinafter, the withholding of such security rights is carried out using the Debt Issuer Rights Management Process (DIRMP) of the present invention, which recognizes and ensures that the above-identified set of individual debt rights is divisible and combinable prior to debt issuance, and that the individual right to lend debt securities (DR ($\eta$, $)) is separately withholdable prior to debt issuance, enabling a company, government, government agency or other entity to effectively preclude short-selling of its debt securities.

Figure 4:
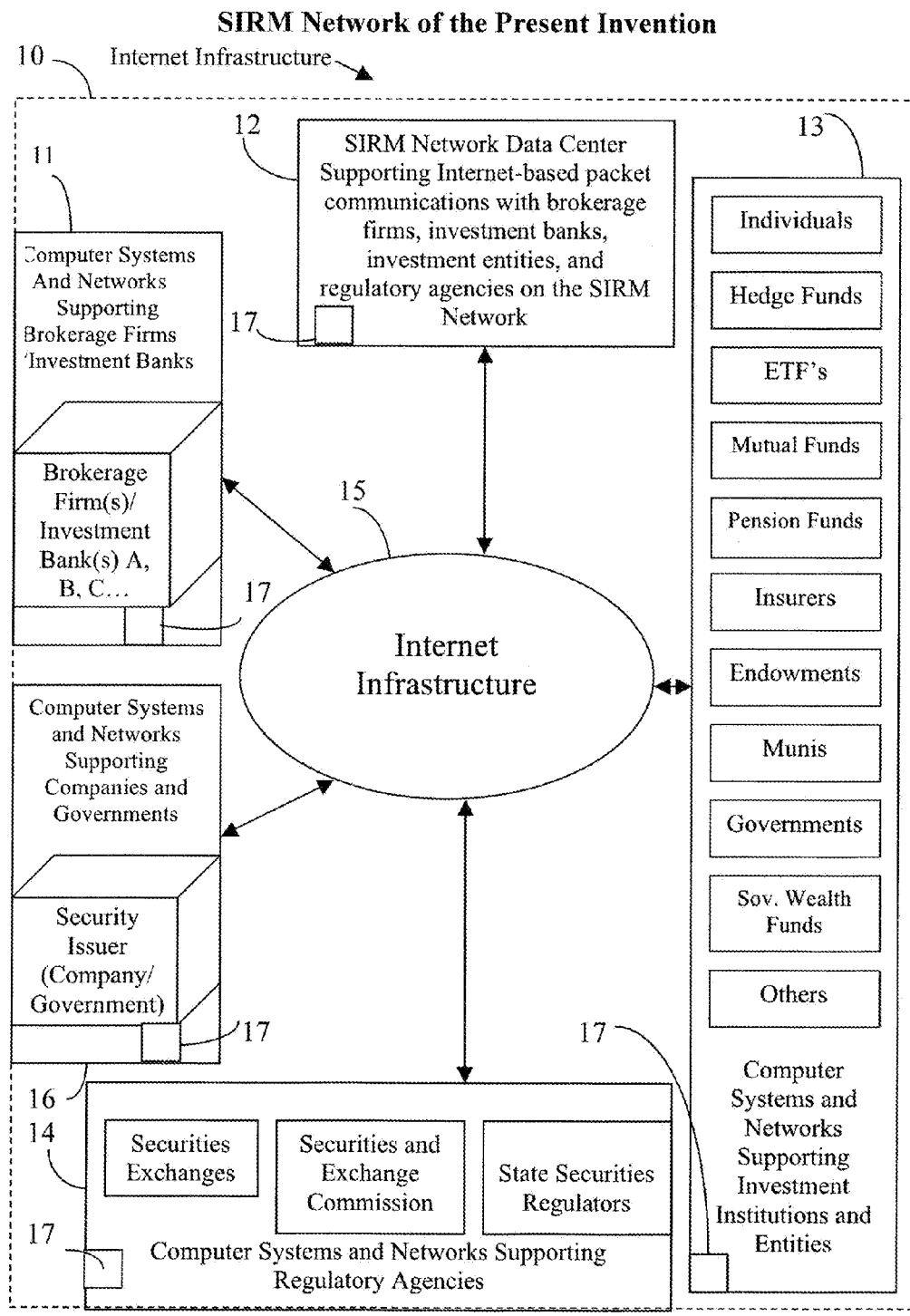
FIG. 4 is a high-level systems block diagram representation of the Internet-based Security Issuer Rights Management (SIRM) network of the present invention, realized as a carrier-class, globally-extensive packet-switched financial information management and communications network, designed and implemented on a Java-based, object-oriented integrated development environment (IDE) such as, for example, WebObjects 5.2 IDE by Apple Computer Inc, Websphere IDE by IBM, or Weblogic IDE by BEA, or Microsoft® Visual Studio 2005.NET IDE.
Figure 5:
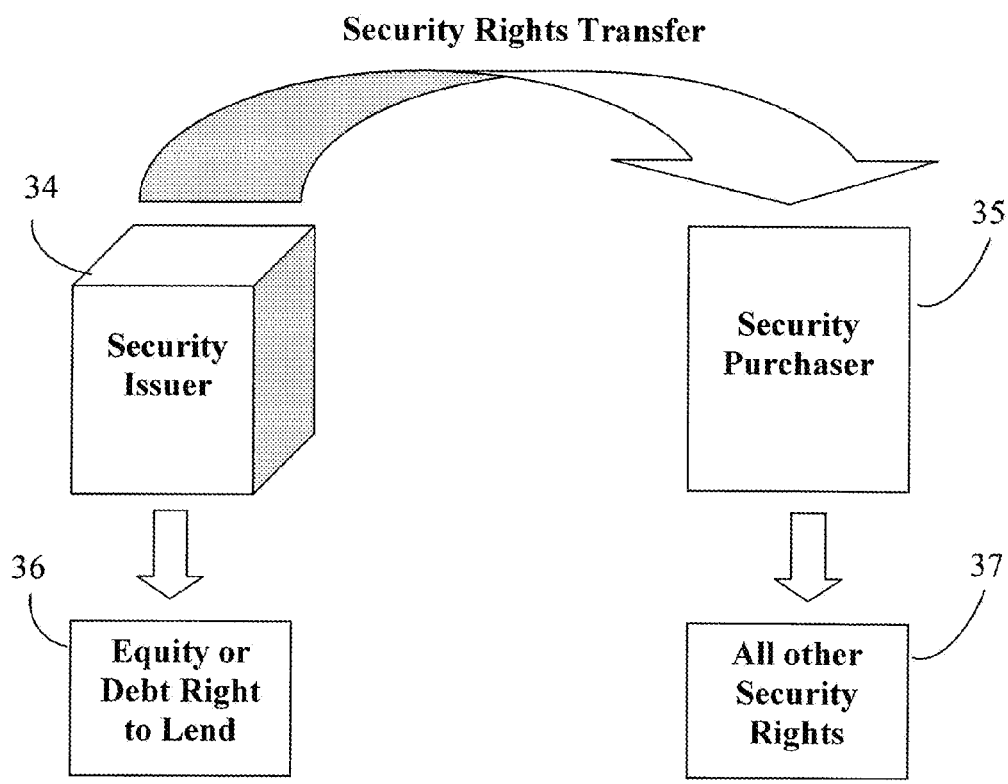
FIG. 5 is a schematic representation of the security rights withholding process of the SIRM network of the present invention carried out on the SIRM network shown in FIG. 4, wherein only the rights to lend equity and/or debt, withheld and retained by an issuer of security ownership interests (shares, preferred shares, warrants, units, bonds, bills, notes, and all other equity and debt interests), are withheld by the security issuer prior to issuance, while the remaining subset of security rights is issued to a purchaser through an initial public offering (IPO), debt offering, or subsequent security offering; by withholding the security right to lend from the offering, the security issuer has effectively precluded anyone holding those security interests from lending them to short-sellers for shorting purposes, thereby allowing both the issuer and purchasers to maximize the utility of the security offering in the global marketplace in accordance with principles of the present invention.
Figure 6A:
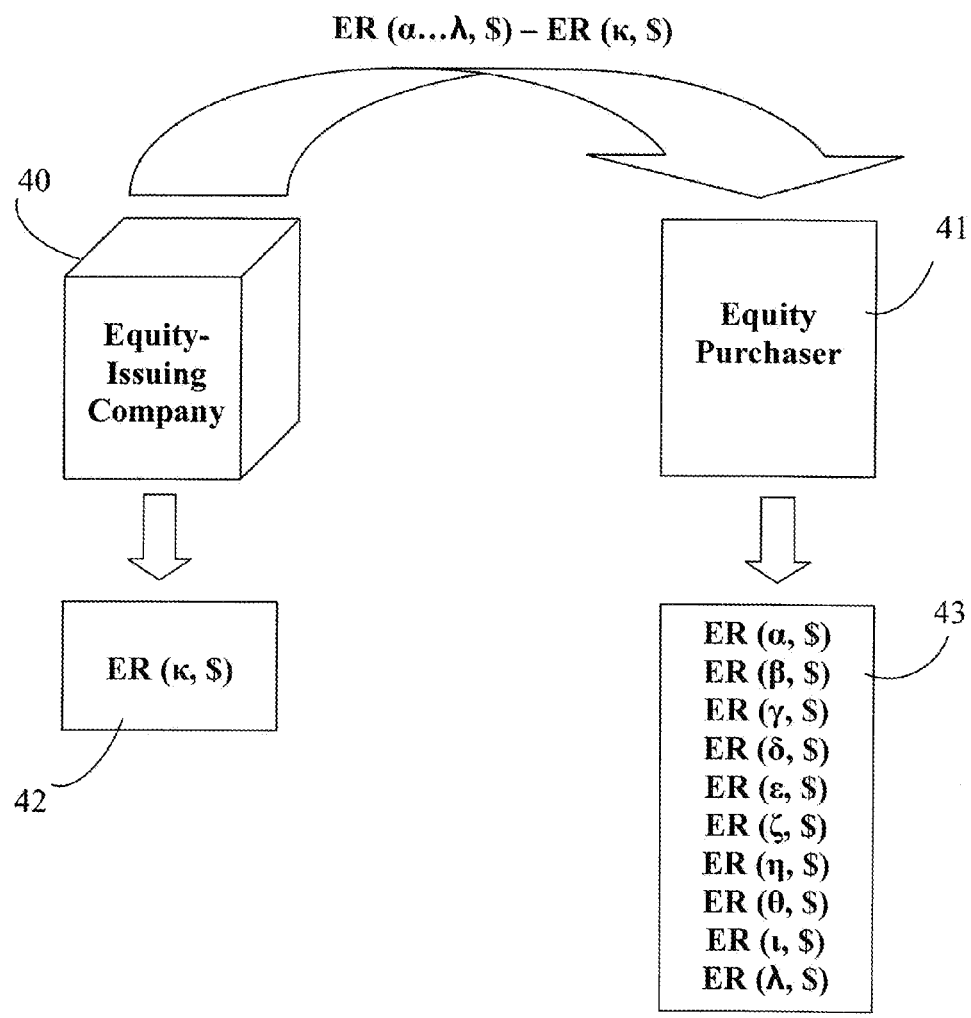
FIG. 6A is a schematic representation of the equity rights withholding process of the SIRM network of the present invention carried out on the SIRM network shown in FIG. 6A, wherein only the right to lend shares (ER ($\kappa$, $)), withheld and retained by an issuer of equity ownership interests (shares, preferred shares, warrants, units, and all other equity interests) is withheld by the equity issuer prior to issuance, while the remaining subset of equity rights (ER ($\alpha \ldots \lambda$, $))-(ER ($\kappa$, $))) is issued to a purchaser through an initial public offering (IPO) or subsequent security offering, thereby effectively precluding anyone holding those equity interests from lending them to short-sellers for short-selling purposes, and allowing both the issuer and equity security purchasers to maximize the utility of the equity offering in the global marketplace in accordance with principles of the present invention.
Figure 6B:
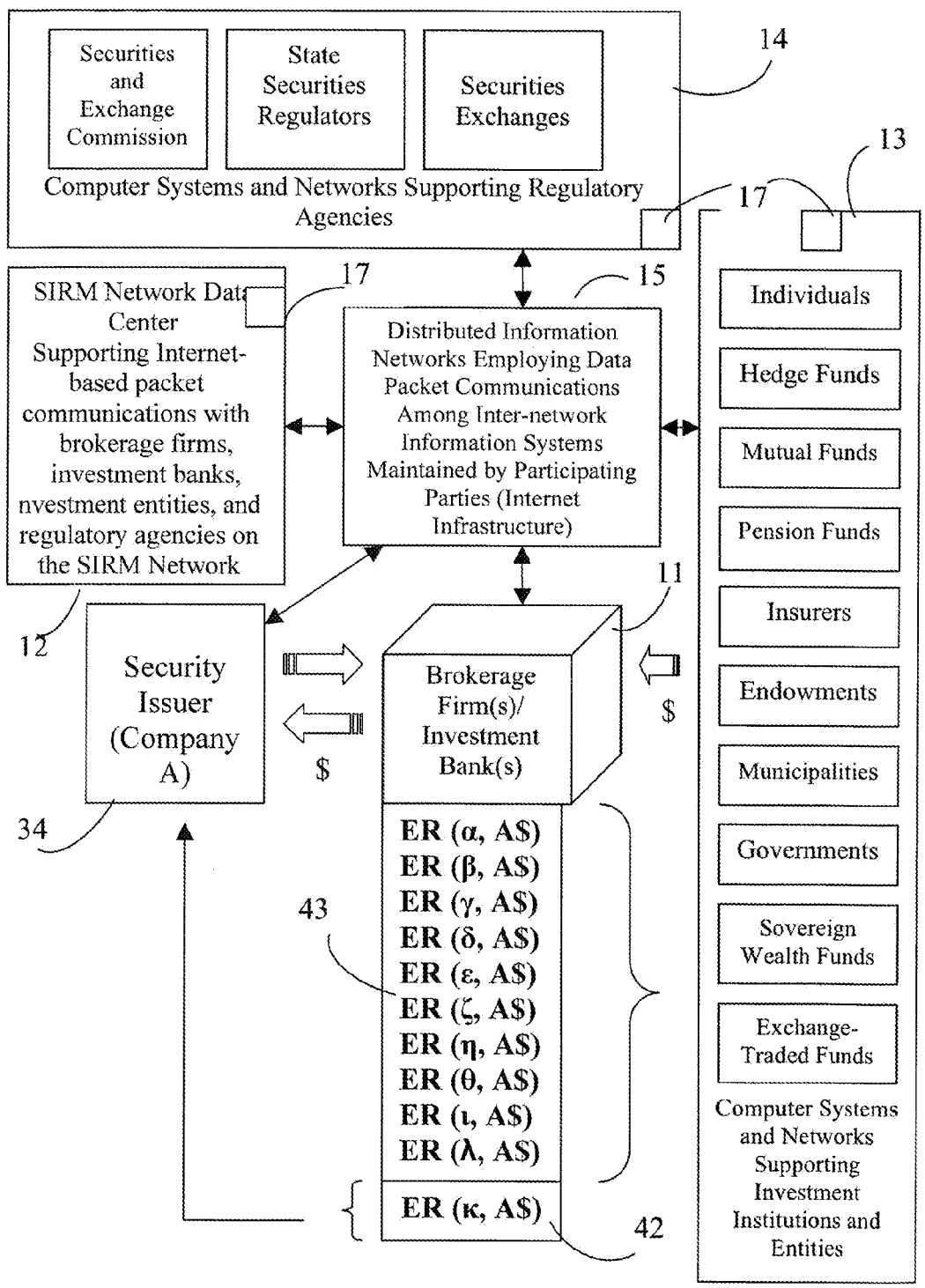
FIG. 6B is a schematic representation of the SIRMP of the present invention carried out on the SIRM network shown in FIG. 4, wherein its various components interact so as to enable a equity security issuer (equity issuer) to withhold, retain, and transfer the right to lend equity securities (ER ($\kappa$, $)), while retaining the right to withhold one or more equity rights associated with equity issuance, in order to help an equity security issuer to achieve its goals with respect to equity issuance, and with respect to its ability to control and profit from the retention, and transference of, the withheld equity right to lend.
Figure 7A:
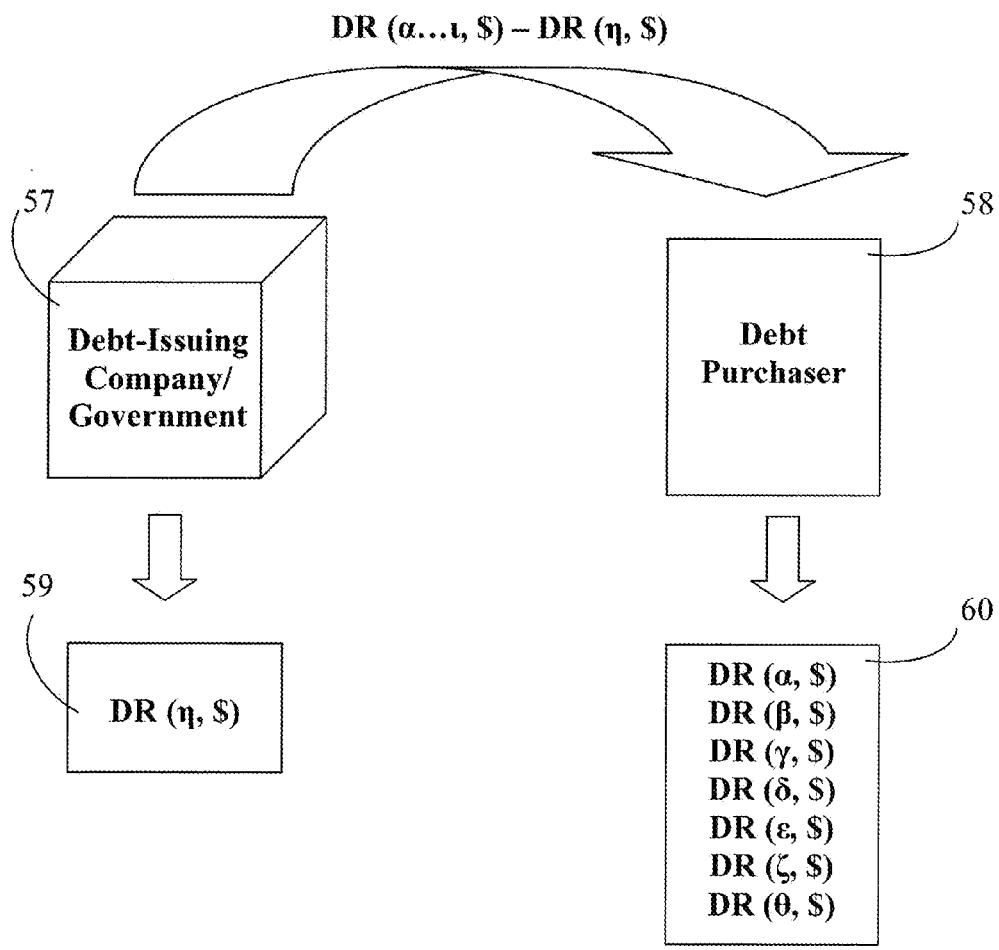
FIG. 7A is a schematic representation of the debt rights withholding process of the present invention carried out on the SIRM network shown in FIG. 4, wherein only the right to lend debt (DR (κ, $)), withheld and retained by an issuer of debt ownership interests (bonds, notes, commercial paper, and all other debt instruments) is withheld by the debt issuer prior to issuance, while the remaining subset of debt rights DR (α . . . ι, $)-DR (η, $) is issued to a purchaser through a debt offering (corporate or government) or subsequent security offering, thereby allowing the security issuer to effectively preclude anyone holding those debt interests from lending them to short-sellers for short-selling purposes, and allowing both the issuer and purchasers to maximize the utility of the debt offering in the global marketplace in accordance with principles of the present invention.
Figure 7B:
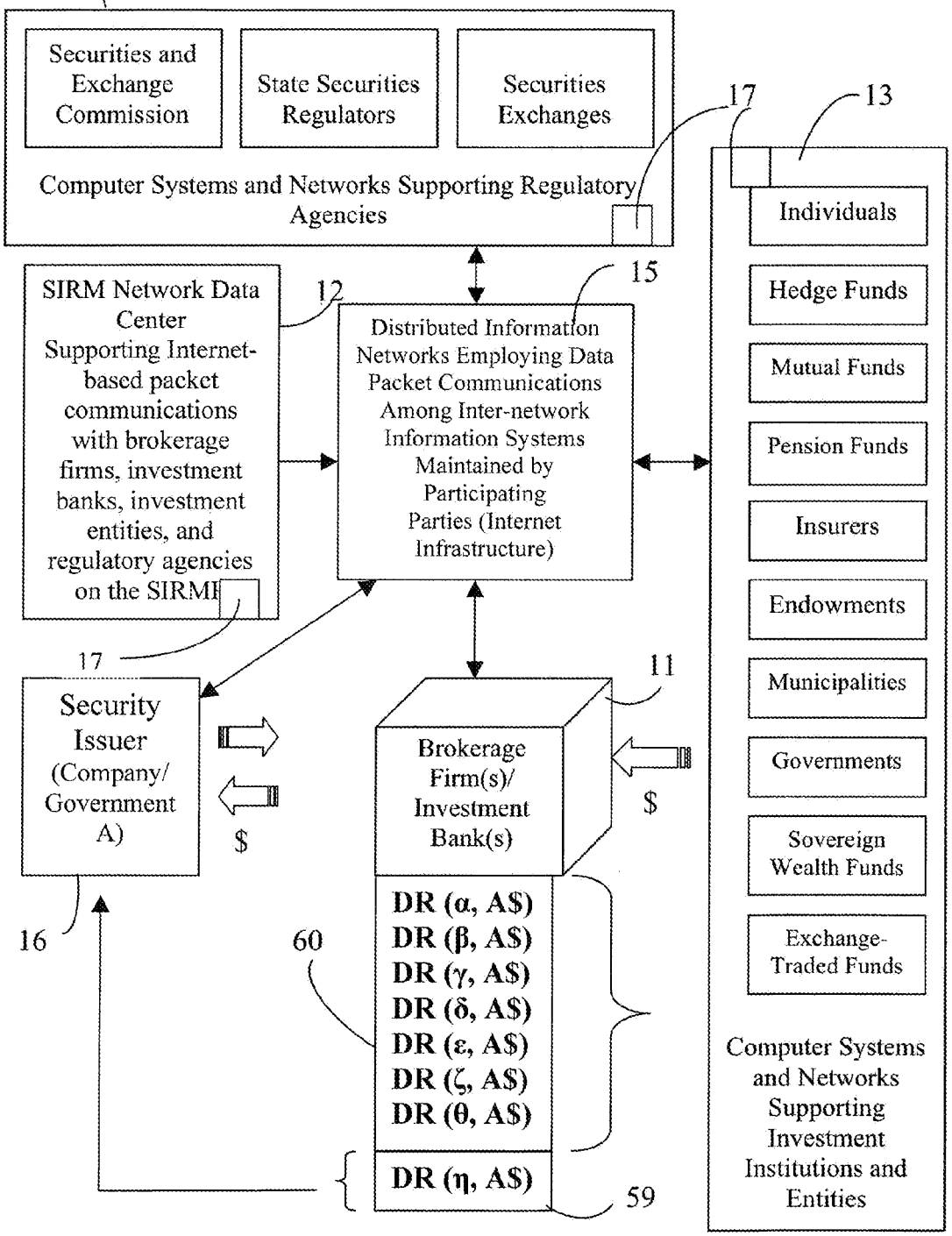
FIG. 7B is a schematic representation of the debt-based SIRM of the present invention carried out on the network of FIG. 4, showing its various components interacting so as to enable a debt security issuer (debt issuer) to withhold, retain, and transfer the right to lend debt securities (DR (η, $)), while one or more debt rights associated with debt issuance can be withheld and retained by the debt security issuer, in order to help a debt security issuer to achieve its goals with respect to debt issuance, and with respect to its ability to control and profit from the retention and transference of the withheld debt right to lend.
Figure 7C:
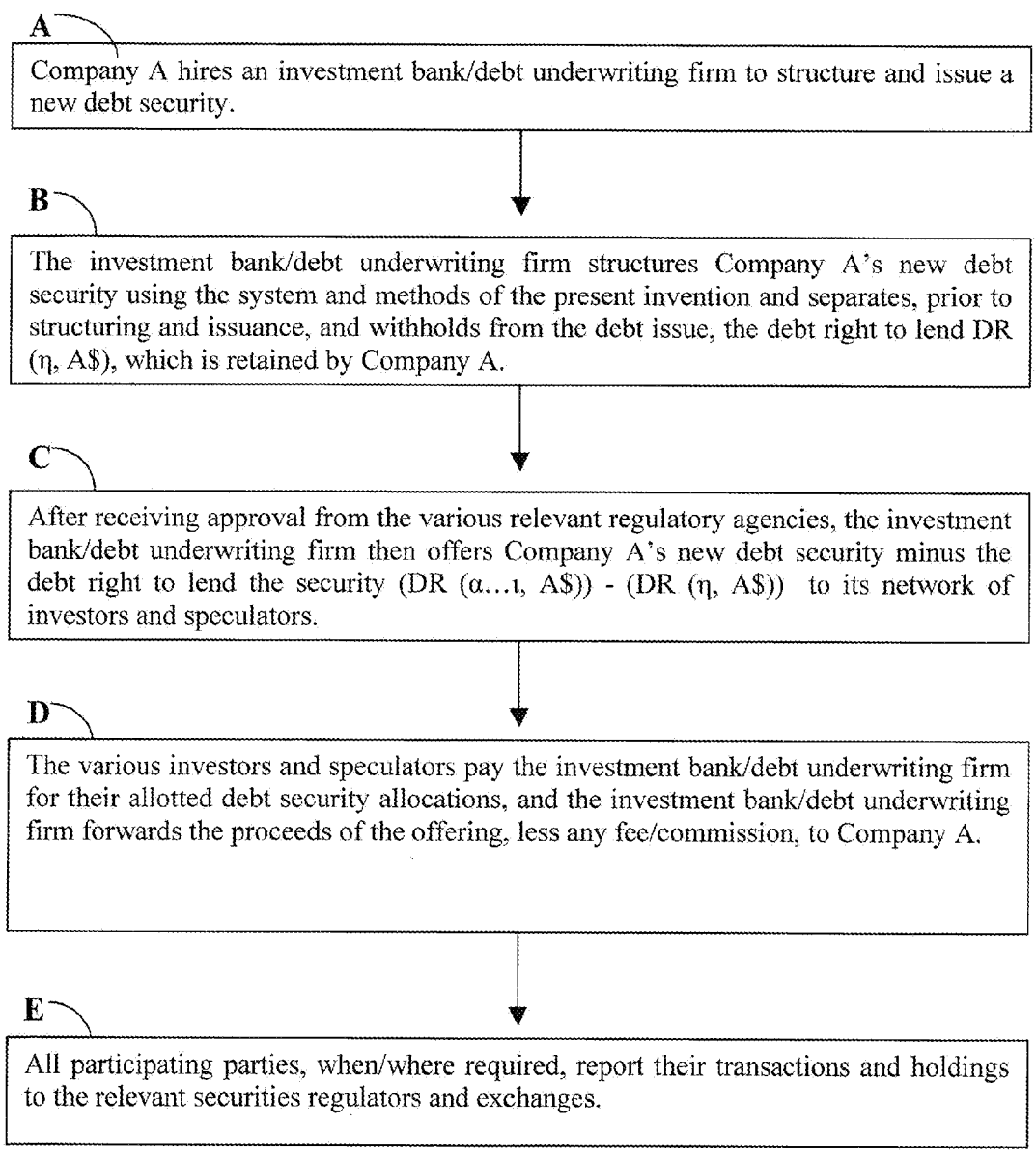
FIG. 7C is a flow chart depicting the various steps of the withholding by a debt-issuing company of the debt right to lend (DR (η, $)) carried out during the debt rights transfer process illustrated in FIG. 7B.

Implementation of the Various Embodiments of the SIRMP Information Network of the Present Invention As shown in FIGS. 4 through 7C, the SIRM network of the present invention 10 supports services necessary to carry out the SIRMP illustrated in FIG. 5, the EIRMP illustrated in FIG. 6A, 6B and 6C and the DIRMP illustrated in FIGS. 7A, 7B and 7C of the present invention. Preferably, the SIRM network 10 is designed and implemented as an industrial-strength carrier-class Internet-based financial information communications network of an object-oriented system engineering (DOSE) design, as taught in Applicant's copending U.S. application Ser. Nos. 11/328,433 and 11/651,413, each incorporated herein by reference in its entirety.

As shown in FIG. 4, the SIRM network 10 comprises a diverse arrangement of computer systems (client and server machines) and networks interfaced with the infrastructure of the Internet, namely: computer systems (client and server machines) and networks supporting brokerage firms and investment banks 11; computer systems (client and server machines) and networks supporting regulatory agencies 14; computer systems (client and server machines) and networks supporting investment institutions and entities 13; computer systems (client and server machines) and networks supporting companies and governments 16; and the SIRMP Data Center 12 supporting Internet-based packet communications with the brokerage firms, investment banks, investment entities, and regulatory agencies on the SIRM network.

As will be described in greater detail hereinafter, the SIRMP Data Center 12 supports various information services between the various computer systems within the network, and among its various users. The SIRMP Data Center 12 will typically include arrays of relational database servers (RDBMS), application servers, and web and other communication servers, arranged in a three-tier structure, and secured by network firewalls, routers, switches and the like, well known in the art.

Each computer system and network within network groups 11, 13, 14 and 16, will typically include arrays of relational database servers (RDBMSs), application servers, and web and other communication servers, arranged in a three-tier structure and secured by network firewalls, routers, switches and the like, in addition to an arrangement of client machines supporting GUI interfaces, with which human users interface in a manner well known in the art.

In practice, the object-oriented SIRM network (system) will be developed using available object-oriented technology. Such object-oriented system development can involve any suitable Java-based, object-oriented integrated development environment (IDE) e.g. WebObjects 5.2 by Apple Computer Inc, Websphere IDE by IBM, or Weblogic IDE by BEA; or another object-oriented programming language such as C sharp, supported by the Microsoft® Visual Studio 2005. NET IDE.

Figure 4A:
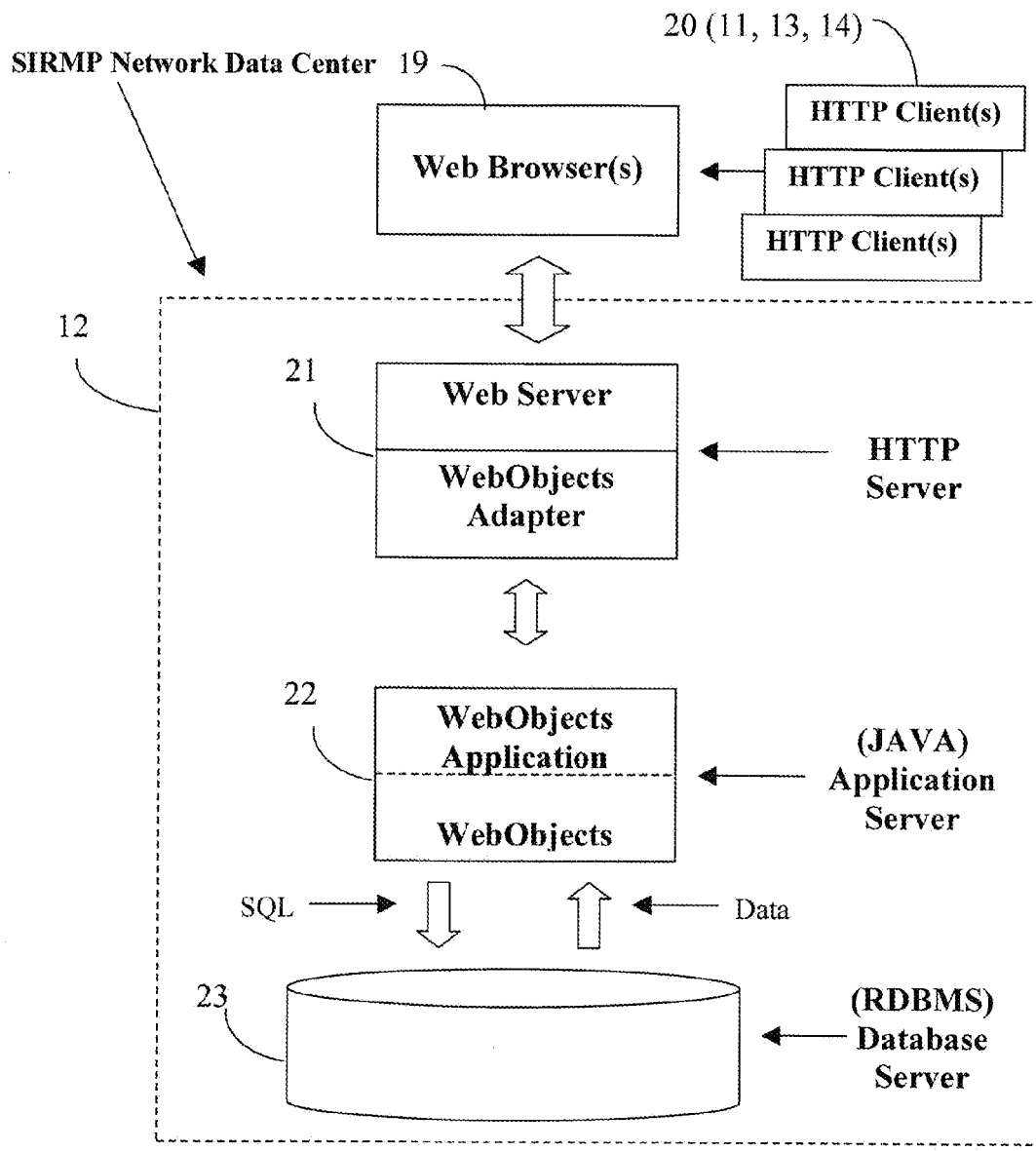
FIG. 4A is a schematic representation of a first enterprise-level implementation of the SIRM network of the present invention.
Figure 4B:
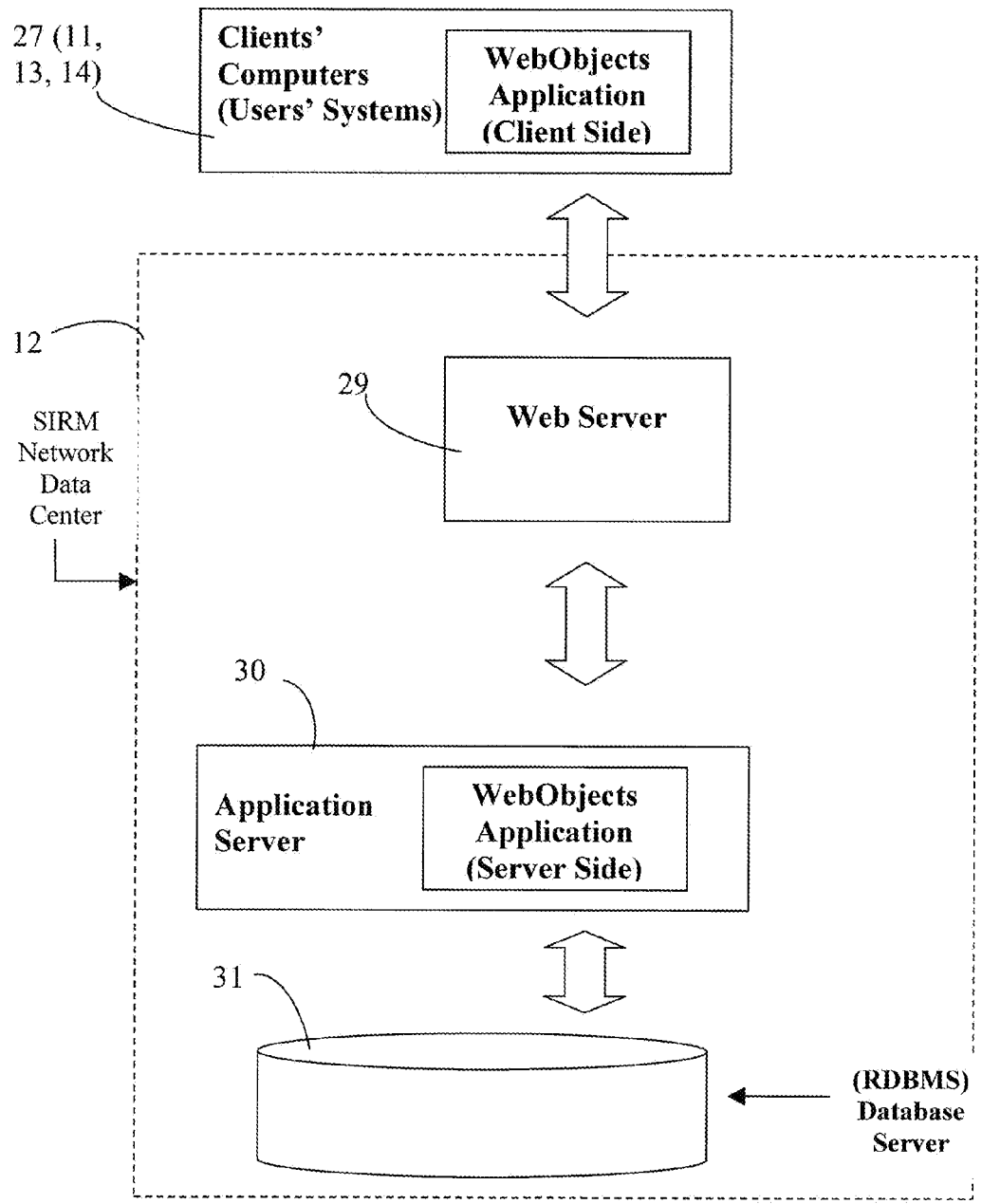
FIG. 4B is a schematic representation of a second enterprise-level implementation of the SIRM network of the present invention.

FIGS. 4A and 4B show two alternative implementations of the enterprise-level SIRM network of the present invention 12 shown in FIG. 4 using the WebObjects® IDE and Java Application Server 21, 22, 29, 30. Although it is understood that other IDE's and server technology platforms can be used to implement and deploy server components of the SIRMP Data Center 12. In FIG. 4A, the SIRM network implementation involves using Web-based clients that can access services on the SIRM network using http, well known in the art. In FIG. 4B, the SIRM network implementation involves using clients programs running on the OS of the client machine, so that the user can access services on the SIRM network using TCP/IP or other communication protocols known in the art. In other embodiments of the SIRM network of the present invention, including those shown in FIGS. 4, 8, 9 and 10, combinations of these two approaches can be used in combination, in a manner known in the enterprise level object-oriented system engineering (DOSE) art.

Figure 8:
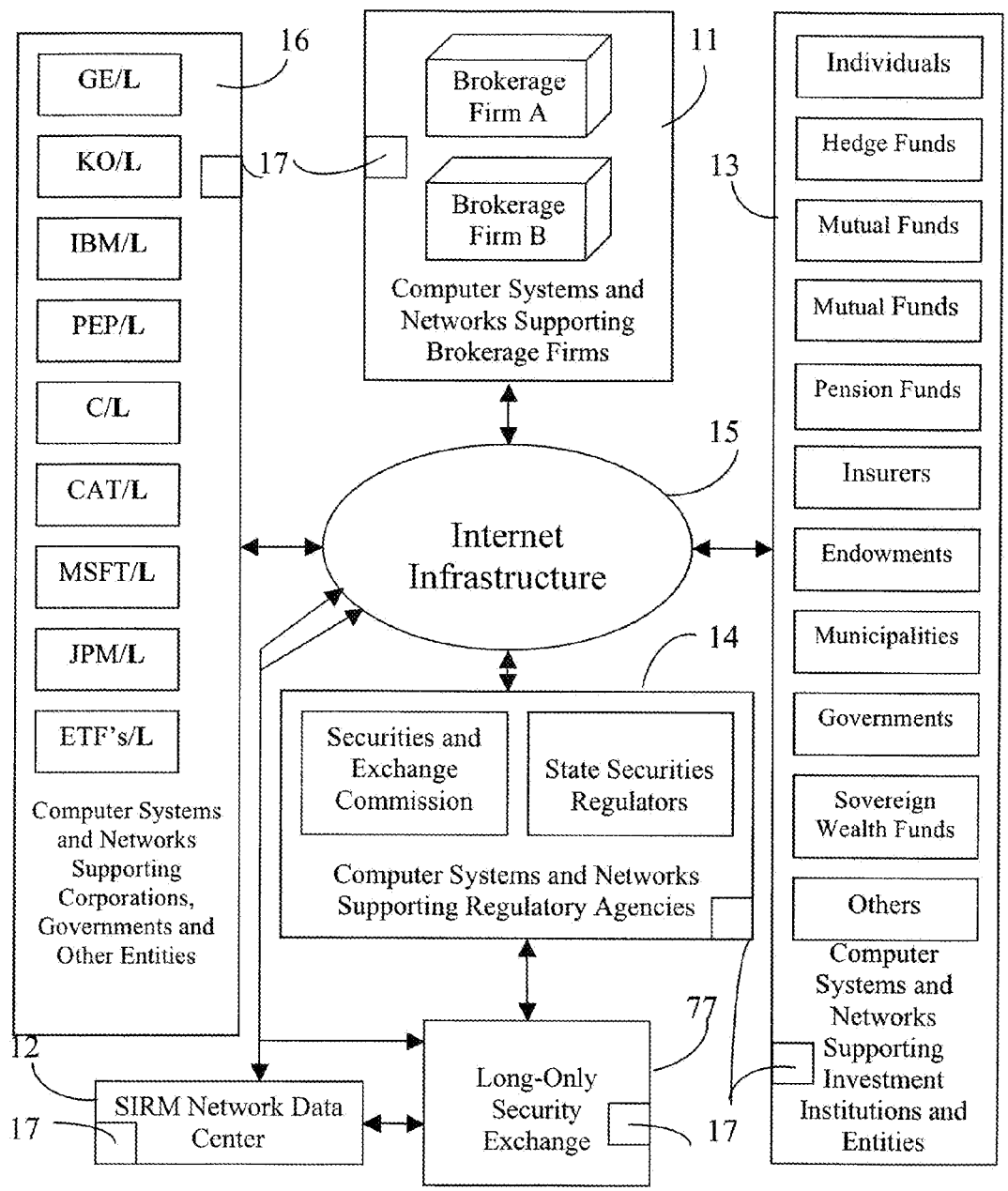
FIG. 8 is a schematic representation of a SIRM network of the present invention employing a Non-borrowable (non-shortable) Equity and/or Debt Security Exchange, and illustrating a process whereby equity and/or debt (and all hybrid) securities issued (or converted) by companies that have withheld the equity right to lend (ER (κ, $)) and/or the debt right to lend (DR (η, $)) from their equity or debt securities (denoted by an "L" after the normal equity or debt symbol), making those securities non-borrowable and, thus, impossible to short-sell by speculators, hedgers and/or investors—the "L" after the normal equity or debt symbol signifies a "long-only" security, which also precludes naked short-selling, as the security's symbol designates it as a long-only security; the "Long-Only Security Exchange" functions just like a normal security exchange, where buyers, typically represented by brokerage firms, buy and sell equity and/or debt securities, and all required transactions are reported to the Securities and Exchange Commission as well as to state security regulators.

In FIG. 8, another embodiment of the SIRM network of the present invention is shown, which is similar to the network in FIG. 4, except that the SIRM network embodiment shown in FIG. 8 further includes a Long-Only Security Exchange 77, which supports the non-borrowable (non-shortable) equity and/or debt security exchange process illustrated in the process flow chart of FIG. 8C. The Long-Only Security Exchange 77 can be realized using the same DOSE technology used to implement the SIRMP Data Center 12 of FIG. 4.

Figure 9:
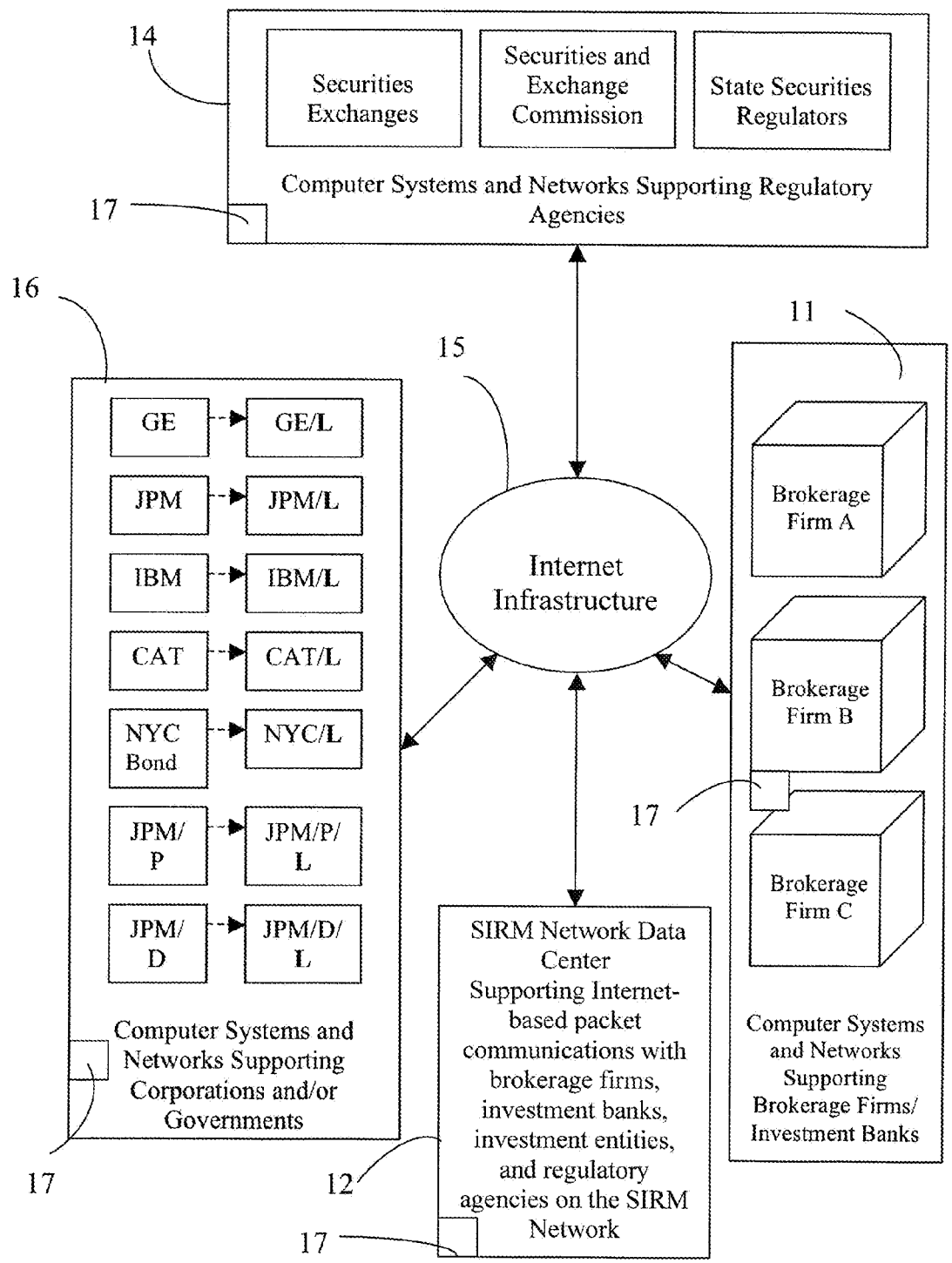
FIG. 9 is a schematic representation of the SIRM network of FIG. 8, supporting the Security Conversion Process of the present invention which allows companies (equity, debt, and hybrid securities) and governments (debt and hybrid securities) to convert their outstanding, issued securities issues into "long-only" securities by way of separating and withholding the equity right to lend (ER (κ, $)) and/or the debt right to lend (DR (η, $)), wherein a participating company or government has one or more investment banks utilize the SIRMP system to restructure its outstanding equity, debt or other security issue(s) by withholding the right to lend that security (equity, debt or other), and then reissue the new security either back to the original owner/holder, back to the company or government, or to the public via the security markets, with the company or government retaining the withheld right to lend its equity and/or debt to preclude short-selling.

In FIG. 9, another embodiment of the SIRM network of the present invention is shown, which is similar to the network in FIG. 4, except that it supports the SIRMP Security Conversion Process of the present invention, illustrated in the block of FIG. 16, and the process flow chart of FIG. 9C.

Figure 10:
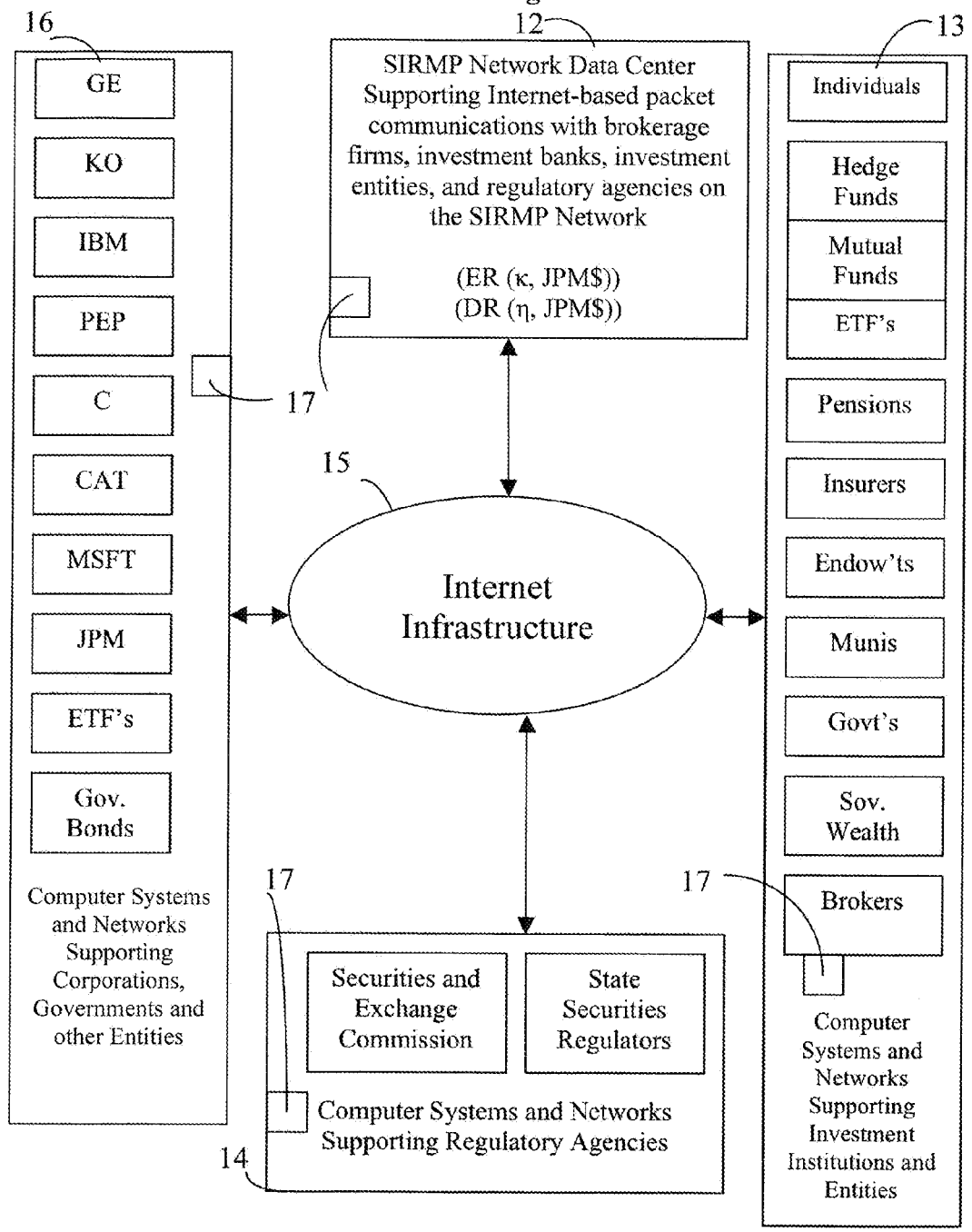
FIG. 10 is a schematic representation of the SIRM network of the present invention employing a Corporate/Government Controlled Rights Management Exchange according to the present invention, which allows corporations, governments and/or government agencies to control the selling short of their equity and/or debt securities by determining lease rates, time periods and the amount of total float available for leasing the withheld equity and/or debt right(s) to lend (ER (κ,), (DR (η, $)), needed by short-sellers to short the securities.

In FIG. 10, yet another embodiment of the SIRM network of the present invention is shown, which is similar to the network in FIG. 4, except that the SIRM network embodiment shown in FIG. 9 further supports the Corporate/Government Controlled Rights Management Exchange Process illustrated in FIG. 10C.

It is appropriate at this juncture to provide a brief overview of the Internet-Based SIRM network present invention.

Brief Overview of the Internet-Based SIRM Network of the Present Invention

The Internet-based SIRM network of the present invention operates in a financial marketplace, and comprises an information network infrastructure operably connected to the infrastructure of the Internet, as shown in FIG. 4. The SIRM network includes one or more equity-issuing companies and/or one or more debt-issuing companies, and a network level financial accounting system 17 that is supported by the web, application and RDBMS servers in the Data Center 12, and various component servers distributed throughout the SIRM network of the present invention, over participating companies, governments, government agencies, financial institutions, and investors. The network level financial accounting system 17 is a component of the object-oriented software-based system that is supported by the web, application and RDBMS servers configured according to a multi-tier network architecture, residing in the Data Center 12, and various component servers distributed over the network of participating companies, governments, government agencies, financial institutions, and investors.

The network-level financial accounting system (i) recognizes and accounts for a set of equity rights possessed prior to equity issuance by an issuer of equity securities and (ii) ensures that said set of equity rights is unbundled, separated into a plurality of individual equity rights (ER ($\alpha \ldots \lambda$, \$)), including the equity right to lend (ER ($\kappa$, \$), and recombined into new, issueable securities that exclude the equity right to lend (ER ($\kappa$, \$)).

The network-level financial accounting system also (i) recognizes and accounts for a set of debt rights possessed by an issuer, owner and/or holder of debt securities and (ii) ensures that said set of debt rights is unbundled, separated into a plurality of individual debt rights (DR ($\alpha \ldots \iota$, \$)), including the debt right to lend (DR ($\eta$, \$)), and recombined into new, issueable securities that exclude the debt right to lend (DR ($\eta$, \$)).

In accordance with the principles of the present invention, the issuer (company or other entity) of an equity security (i) withholds from, and prior to, an equity security structuring/offering, the equity right to lend (ER ($\kappa$, \$)) the security in order to preclude lending/borrowing of the security and, thus, preclude short sales of the security or, (ii) restructures an existing, outstanding equity security to exclude from, and retain, the equity right to lend (ER ($\kappa$, \$)) the security in order to preclude lending/borrowing of the equity security and, thus, preclude short sales of the security.

In accordance with the principles of the present invention, the issuer (company or government) of a debt security (i) withholds from, and prior to, a debt security structuring/offering, the debt right to lend (DR ($\eta$, \$)) the security in order to preclude lending/borrowing of the debt security and, thus, preclude short sales of the security or, (ii) restructures an existing, outstanding debt security to exclude from, and retain, the debt right to lend (DR ($\eta$, \$)) the security in order to preclude lending/borrowing of the debt security and, thus, preclude short sales of the debt security.

When a transfer of the individual right(s) to lend equity and/or debt occurs, the Internet-based SIRM system/network automatically accounts for the location of that/those rights and collects and remits proper payment in exchange for those rights.

Security Issuer Rights Management Process (SIRMP) of the Present Invention

As shown in FIG. 5, the Security Issuer Rights Management Process (SIRMP) of the present invention represents a significant improvement over the conventional security Issuance (Prior Art) as illustrated in FIG. 1. In FIG. 5, the SIRMP is shown with a security issuer 34 withholding, prior to structuring and issuance, the right to lend 36 its security in order to allow a security issuer 34 to prevent that security at issuance (or thereafter), from being lent to speculators and investors for the purpose of borrowing that security to short-sell it into the market; at the same time, all of the other security rights 37 within the bundle possessed prior to issuance by the issuer 34 are issued to purchaser 35 of the security for full use by an owner or holder to maximize the utility of the security held in the global financial marketplace, in accordance with the principles of the present invention.

By withholding the right to lend the security prior to security structuring and issuance, the security-issuing entity has effectively precluded a short-sale of the security, as it cannot be sourced and borrowed by a speculator or investor for the purpose of selling it short. Also, by withholding the right to lend 36 a security prior to structuring and issuance, the security issuer 34 has also effectively precluded naked short-selling (an illegal but common practice) of the security because all market participants, brokers and dealers will be aware that the security cannot be lent to be shorted. The security issuer 34 has effectively prevented short-selling of this security making it safer for long-term investors to purchase and hold, because only those actually holding the security will be able to sell it to other interested buyers, and because the security will not be available for those looking to sell it short as a hedge against derivative instruments bought/sold on the underlying security. If it is impossible to hedge derivative instruments by shorting a security, there will be less speculative selling pressure on the security, which will allow it greater flexibility (and less dilution) in raising capital via future equity and/or debt issuance.

The practice of short-selling is often defended with the argument that it adds liquidity to the market. To combat the potential issue of reduced liquidity, the security issuer 34 could simply increase the amount of initial securities issued and lower the price to raise a similar amount of money. The increased number of securities will help provide additional liquidity.

Equity Issuer Rights Management Process (EIRMP) of the Present Invention

As shown in FIG. 6A, the E represents a significant improvement over the conventional security issuance (Prior Art) as illustrated in FIG. 1. In this figure, the EIRMP is shown with an equity issuer 40 withholding the individual right to lend an equity security (ER ($\kappa$, \$)) 42 possessed by an equity issuer 40 prior to an equity issue's structuring and issuance, in order to allow an equity security issuer 40 to prevent that security, at issuance (or thereafter), from being lent to speculators and investors for the purpose of borrowing that security to short-sell it into the market, while all of the other equity rights within the bundle possessed by the issuer prior to structuring and issuance (ER ($\alpha \ldots \lambda$, \$))-(ER ($\kappa$, \$)) 43 are structured and issued to purchasers 41 of the equity security for full use by an owner or holder to maximize the utility of the equity security held in the global financial marketplace, in accordance with the principles of the present invention.

By withholding the equity right to lend (ER ($\kappa$, \$)) 42 prior to security structuring and issuance, the equity-issuing company or entity 40 has effectively precluded a short-sale of the equity security, either by the initial purchaser 41 or, by subsequent purchasers 41; it cannot be sourced and borrowed by a speculator or investor for the purpose of selling it short. Also, by withholding the equity right to lend (ER ($\kappa$, \$)) 42 prior to structuring and issuance, the equity security issuer 40 has also effectively precluded naked short-selling (an illegal but common practice) of the security because all market participants, brokers and dealers will be aware that the security cannot be lent to be shorted. The equity security issuer 40 has effectively prevented short-selling of this security, making it safer for long-term investors to purchase and hold, because only those actually holding the security will be able to sell it to other interested buyers, and because the security will not be available for those looking to sell it short as a hedge against derivative instruments bought/sold on the underlying security. Furthermore, by precluding speculators and investors from selling short the equity security 43, speculators and investors cannot pressure a company's or entity's equity in order to make it more expensive/more dilutive for a company or entity to raise new capital via equity security issuance.

As illustrated in FIG. 6B, the implementation of the Security Issuer Rights Management Process (SIRMP) (Equity) of FIG. 5 is shown incorporating the SIRMP Data Center 12, an equity security-issuing company 16, a brokerage/equity underwriting firm (investment bank, merchant bank, bank or other financial institution) 11, various equity-purchasing entities (individuals, hedge funds, mutual funds, pension funds, insurers, endowments, municipalities, governments, sovereign wealth funds and exchange-traded funds) 13, various regulatory agencies, including the Securities and Exchange Commission (SEC) and state security regulators, and, finally, the various securities exchanges 14. Each of the aforementioned participants is linked to the others via various communications networks and via the Internet 15.

As shown in FIG. 6B, an equity security-issuing company (Company A) 16 hires an equity security brokerage/underwriting firm (investment bank, etc.) 11, utilizing the SIRMP Data Center 12 of FIG. 4, to help structure and issue equity securities in order to raise capital to fund the firm's operations. The equity security underwriter 11 structures Company A's 16 new equity security issue 43 and, at the instruction of Company A 16, incorporates the system and method of the present invention, whereby the equity underwriter 11 recognizes that an equity security consists of a bundle of rights (ER ($\alpha \ldots \lambda$, A$)) 42, 43, which can be unbundled, separated, and recombined into an individual, issueable security. From this bundle of rights, the equity right to lend (ER ($\kappa$, A$)) 42 is withheld prior to structuring and issuance in order to allow an equity issuer to either preclude or control short-selling of its equity security issue in the global financial marketplace.

The equity security underwriter 11 structures Company A's 16 equity security issue (in this example) so that Company A withholds the right to lend its equity securities (ER ($\kappa$, A$)) 42 prior to issuance of the new Company A equity security, which now is represented by the equation (ER ($\alpha \ldots \lambda$, A$))-(ER ($\kappa$, A$)) 43. The equity underwriter 11 then offers for purchase Company A's new security 43 to a broad array of investors including: individuals, hedge funds, mutual funds, pension funds, insurers, endowments, municipalities, governments, sovereign wealth funds and exchange-traded funds 13. These investors pay the equity underwriter 11 for their Company A equity security 43 purchases, and the equity underwriter 11 forwards the proceeds of the offering to Company A 16 less any previously agreed commission for the underwriter's services. Company A 16, the equity security underwriter 11 and, in some cases, various of the equity purchasing entities 13, report all facets of the security's structure, offering terms, sale and purchases to the various regulatory agencies 14 as represented in FIG. 6B.

Company A 16 has now issued a new equity security 43 and raised new capital but has withheld from the purchasers 13 the equity right to lend (ER ($\kappa$, A$)) 42 this security for the purposes of short-selling this security issue, as speculators and investors cannot borrow this security issue from the purchasers for the purpose of selling them short. Furthermore, it will be much harder for speculators and investors to purchase bearish derivative instruments on Company A's new shares 43, as the potential sellers of those bearish derivative instruments will be unable to borrow Company A's 16 new equity security 43 to sell short in an effort to hedge their sale of the bearish derivative instruments. Company A 16 has also effectively precluded leveraged, bearish exchange-traded funds (ETF's) from including Company A's new equity security 43 in their funds, as the ETF's are also precluded from borrowing the shares to sell short. Holders of Company A's new equity security 43 enjoy all of the benefits (issued equity rights) of normal equity ownership, except that they cannot lend the new security 43 to investors and speculators for the purpose of short-selling it.

As indicated at Block A in FIG. 6C, Company A hires an investment bank/equity underwriting firm, utilizing the SIRMP of FIG. 5, for the purpose of structuring and issuing a new equity security to withhold the equity right to lend that new security (ER ($\kappa$, A$)). At Block B, the investment bank/equity underwriting firm structures Company A's equity security by withholding/excluding from the new equity issue the equity right to lend the new Company A equity securities (ER ($\kappa$, A$)), which is retained by Company A. At Block C, the investment bank/equity underwriting firm then issues the new Company A equity security ((ER ($\alpha \ldots \lambda$, A$)-(ER ($\kappa$, A$)) to its network of investors and speculators. At Block D, the investors and speculators pay for the new Company A equity security, and the investment bank/equity underwriting firm delivers the proceeds from the new equity offering to Company A, less any fees/commissions; the equity right to lend the new Company A equity security (ER ($\kappa$, A$)) has been retained by Company A. At Block E, all parties report required transactions to the various security regulators and security exchange(s).

Debt Issuer Rights Management Process (DIRMP) of the Present Invention

As shown in FIG. 7A, the Debt Issuer Rights Management Process (DIRMP) of the present invention represents a significant improvement on the conventional security issuance (Prior Art) as illustrated in FIG. 1. In FIG. 7A, the DIRMP is shown with a debt issuer 57 withholding the individual right to lend debt securities (DR ($\eta$, $)) 59 possessed by a debt issuer 57 prior to a debt issue's structuring and issuance, in order to allow a debt security issuer 57 to prevent that security, at issuance (or thereafter), from being lent to speculators and investors for the purpose of borrowing that security to short-sell it into the market, while all of the other debt rights within the bundle possessed by the issuer prior to structuring and issuance (DR ($\alpha \ldots \iota$, $))-(DR ($\eta$, $)) 60 are structured and issued to purchasers 58 of the debt security for full use by an owner or holder to maximize the utility of the debt security held in the global financial marketplace, in accordance with the principles of the present invention.

By withholding the debt right to lend (DR ($\eta$, $)) 59 prior to security structuring and issuance, the debt-issuing company or government 57 has effectively precluded a short-sale of the debt security 60, as it cannot be sourced and borrowed by a speculator or investor for the purpose of selling it short. Also, by withholding the debt right to lend (DR ($\eta$, $)) 59 prior to structuring and issuance, the debt security issuer 57 has also effectively precluded naked short-selling (an illegal but common practice) of the security because all market participants, brokers and dealers will be aware that the security cannot be lent to be shorted. The debt security issuer 57 has effectively prevented short-selling of this security 60 making it safer for long-term investors to purchase and hold, because only those actually holding the security will be able to sell it to other interested buyers, and because the security will not be available for those looking to sell it short as a hedge against derivative instruments bought/sold on the underlying security. Furthermore, by precluding speculators and investors from selling short the debt security 60, speculators and investors cannot pressure a company's or government's debt in order to force ratings agencies to lower their ratings on the security, which drives up a company's or government's future borrowing costs.

As shown in FIG. 7B, a debt security-issuing company (Company A) 16 hires a debt security brokerage/underwriting firm (investment bank, etc.) 11, utilizing the SIRMP 12 of FIG. 4, to help structure and issue a debt security in order to raise capital to fund the firm's operations. The debt security underwriter 11 structures Company A's new debt security issue 60 and, at the instruction of Company A 16, incorporates the system and method of the present invention, whereby the debt underwriter 11 recognizes that a debt security consists of a bundle of rights (DR (α . . . ι, $)) 59, 60, which can be unbundled, separated, and recombined into an individual, issueable security. From this bundle of rights, the debt right to lend (DR (η, A$)) 59 is withheld prior to structuring and issuance in order to allow a debt issuer to either preclude or control short-selling of its debt security in the global financial marketplace.

The debt security underwriter 11 structures Company A's debt security 60 so that Company A 16 withholds the debt right to lend (DR (η, A$)) 59 prior to issuance of the new Company A debt security, which now is represented by the equation (DR (α . . . ι, A$))-(DR (η, A$)) 60. The debt security underwriter 11 then offers for purchase Company A's new debt security issue 60 to a broad array of investors including: individuals, hedge funds, mutual funds, pension funds, insurers, endowments, municipalities, governments, sovereign wealth funds and exchange-traded funds 13. These investors pay the debt underwriter 11 for their Company A debt security 60 purchases, and the debt underwriter 11 forwards the proceeds of the offering to Company A 16 less any previously agreed commission for the underwriter's services. Company A 16, the debt security underwriter 11 and, in some cases, various of the debt purchasing entities 13, report all facets of the security's structure, offering terms, sale and purchases to the various regulatory agencies 14 as represented in FIG. 7B.

Company A 16 has now issued a new debt security 60 and raised new capital but has withheld from the purchasers the debt right to lend (DR (η, A$)) 59 the debt security for the purpose of short-selling that security, as speculators and investors cannot borrow this security from the purchasers for the purpose of short-selling them. Furthermore, it will be much harder for speculators and investors to purchase bearish derivative instruments on Company A's debt security issue 60, as the potential sellers of those bearish derivative instruments will be unable to borrow Company A's new debt security 60 to sell short in an effort to hedge their sale of the bearish derivative instruments. Company A 16 has also effectively precluded leveraged, bearish exchange-traded funds (ETF's) from including Company A's new debt security 60 in their funds, as the ETF's are also precluded from borrowing the debt security 60 to sell it short. Purchasers 13 of Company A's new debt security 60 enjoy all of the benefits (remaining debt rights) of normal debt ownership except they cannot lend the new security to investors and speculators for the purpose of short-selling it.

As indicated at Block A in FIG. 7C, Company A hires an investment bank/debt underwriting firm, utilizing the SIRMP 12 of FIG. 4, for the purpose of issuing a new debt security but withholding the debt right to lend that debt security (DR (η, A$)). At Block B, the investment bank/debt underwriting firm structures Company A's debt security by separating the attendant debt security rights and withholding the debt right to lend the new Company A debt security (DR (η, A$)), which is retained by Company A. At Block C, the investment bank/debt underwriting firm then issues the new Company A debt security (DR (α . . . ι, A$))-(DR (η, A$)) to its network of investors and speculators. At Block D, the investors and speculators pay for the new Company A debt security, and the investment bank/debt underwriting firm delivers the proceeds from the new debt offering to Company A, less any fees/commissions. At Block E, all parties report required transactions to the various security regulators and security exchange(s).

SIRM Network of the Present Invention Supporting A Non-Borrowable (Non-Shortable) Equity and/or Debt Security Exchange As illustrated in FIG. 8, the non-borrowable (non-shortable) equity and/or debt security exchange is shown, wherein companies and/or governments 16 that have issued equity and/or debt securities (common stock, preferred stock, warrants and other equity securities, bonds, notes, or other debt securities, and all hybrids) and withheld the equity/debt right to lend those securities (ER (κ, $))/(DR (η, $)) 42, 59, via the SIRMP 12, have listed their equity and/or debt securities ("JPM/L" is an example of these "long-only" securities). As these equity and/or debt securities, designated by the "L" after their normal equity/debt symbol for "long-only", cannot be lent by the owner/holder of these equity and/or debt securities to other investors, hedgers and/or speculators 13 for the purpose of selling the securities short, these companies' or governments' 16 listed equity and/or debt securities cannot be sold short.

Similarly, these equity and/or debt securities are not subject to naked-shorting, as they trade on a "Long-Only Security Exchange" 77, and the "L" in each security's equity/debt symbol designates it as a "long-only" equity or debt security, as the equity right to lend (ER (κ, $)) 42 or the debt right to lend (DR (η, $)) 59 has been withheld from the security prior to issuance leaving the subset of equity rights (ER (α . . . λ, $))-(ER (κ, $)) 42, 43 or the subset of debt rights (DR (α . . . ι, $))-(DR (η, $)) 59, 60 with the issued equity or debt security.

Most importantly, as shown in FIG. 8, all trades by market participants (individuals, hedge funds, mutual funds, pension funds, insurers, endowments, municipalities, governments, sovereign wealth funds, exchange-traded funds and others) 13 are conducted via various equity security accounts held at the market participants' brokerage firms 11 (Long-Only Security Exchange 77 Members). As such, the brokerage firms 11 have access to the market participants' positions and can assure that only equity and/or debt securities already held by a market participant can be sold into the market, further precluding short sales of any type. In the event that market participants 13 (hedge funds and other speculators and investors) are concerned about secrecy of their trading, they can sell the "long-only" equity and/or debt securities with a brokerage firm other than that where they hold their "long-only" equity and debt securities, as long as proper netting agreements are in place—these will also serve to assure that only equity and/or debt securities already owned/held can be sold.

As with other security exchanges, all relevant transactions are reported to the various regulatory agencies 14 and monitored by the same.

Figure 8A:
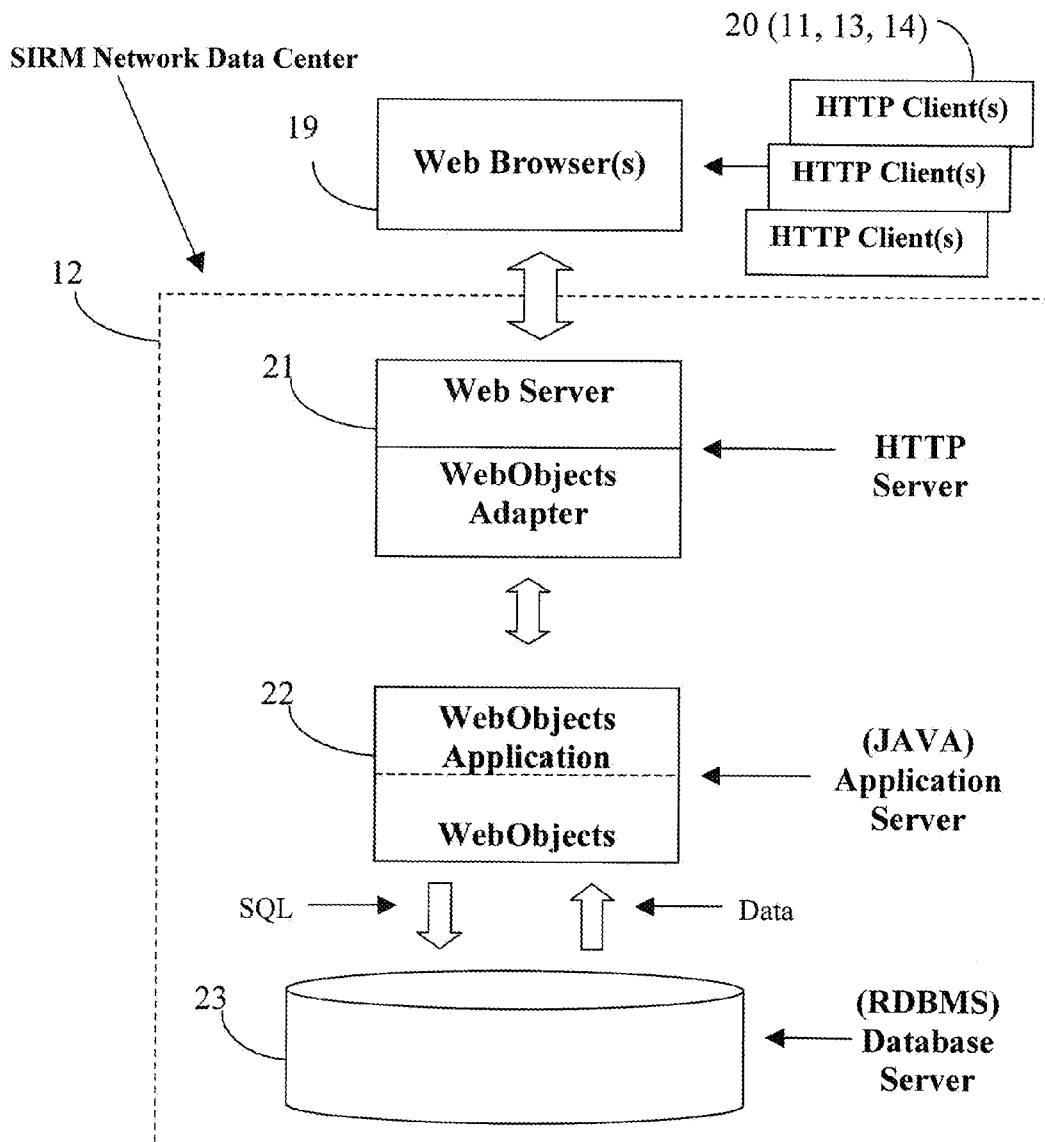
FIG. 8A is a schematic representation of a first enterprise-level implementation of the SIRM network of FIG. 8.
Figure 8B:
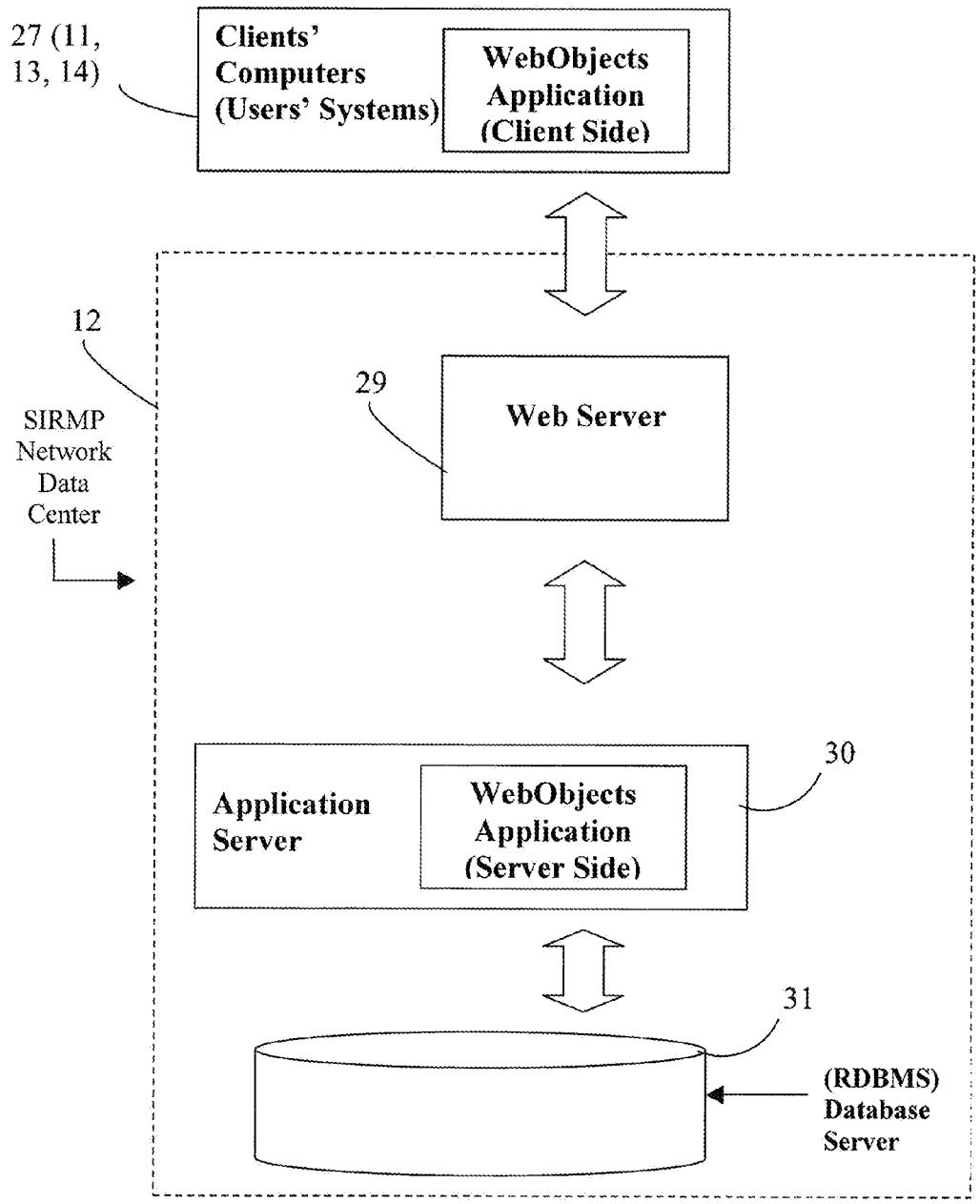
FIG. 8B is a schematic representation of second enterprise-level implementation of the SIRM network of the present invention.

FIGS. 8A and 8B show two alternative implementations of the enterprise-level SIRMP Data Center 12 using the WebObjects® IDE and Java Application Server 21, 22, 29, 30, although it is understood that IDE's and server technology platforms can be used to implement and deploy server components of the SIRMP Data Center 12.

FIG. 8C is a flow chart depicting the non-borrowable (non-shortable) equity and/or debt security exchange and network of FIG. 8. As indicated at Block A, companies that have issued, or converted, their existing securities into non-shortable/non-borrowable equity or debt securities via the SIRMP, list their securities on the Long-Only Security Exchange. At Block B, investment institutions and entities then purchase the non-shortable/non-borrowable listed equity and/or debt securities via a brokerage firm that holds member status on the Long-Only Security Exchange. Finally, at Block C, the investment institutions and entities, along with the brokerage firm(s), report all pertinent transactions on the Long-Only Security Exchange to the proper Regulatory Agencies.

SIRM network of the Present Invention Supporting Security Conversion Process

As is illustrated in FIG. 9, the SIRMP security conversion process of the present invention allows participating companies and governments 16 to convert already issued, outstanding equity, debt and other securities, which can be borrowed and sold short, into "long-only" securities, which cannot be borrowed/sold-short, by employing the SIRMP Data Center 12 of FIG. 4.

A company, government, or other entity 16 with outstanding security issues sends notice to the owners and holders of one or more of its security issues, announcing a proxy vote on converting its outstanding security or securities into a "long-only" security or securities. Through the conversion process, the security issuer 16 normally hires an investment bank(s) 11 utilizing the SIRMP Data Center 12 of FIG. 4, to withhold and retain the equity and/or debt right to lend ((ER ($\kappa$, \$)), (DR ($\eta$, \$))) 42, 59 that/those security/securities, precluding it/them from being lent to speculators, investors and/or hedgers for the purpose of selling them short and betting against the fortunes of the companies or government.

Once the notice of conversion has been sent (and approval received, if needed), the company or government 16 enlists the services of one or more investment banks 11 to complete the conversion process. The investment bank(s) 11 utilize(s) the system and methods of the SIRMP 12 of the present invention to restructure and reissue new securities, (ER ($\alpha$ ... $\lambda$, \$))-(ER ($\kappa$, \$)) 43 for equity securities, and (DR ($\alpha$ ... $\iota$, \$))-(DR ($\eta$, \$)) 60 for debt securities, pursuant to the security issuer's 16 desires which, in the example shown in FIG. 9, involve the issuer 16 withholding either the equity right to lend (ER ($\kappa$, \$)) 42 or the debt right to lend (DR $\eta$, \$)) 59.

Once restructured and reissued by the investment bank(s) 11, the company, government, or other entity 16 using the system and methods of the SIRMP Data Center 12 of FIG. 4, has effectively precluded from short-selling the now "long-only" securities, which, in this example, are designated by an "L" following the security's standard symbol, by speculators, investors and/or hedgers.

All parties report required transactions and information to the relevant regulatory agencies and to the proper security exchange(s) 14.

Figure 9A:
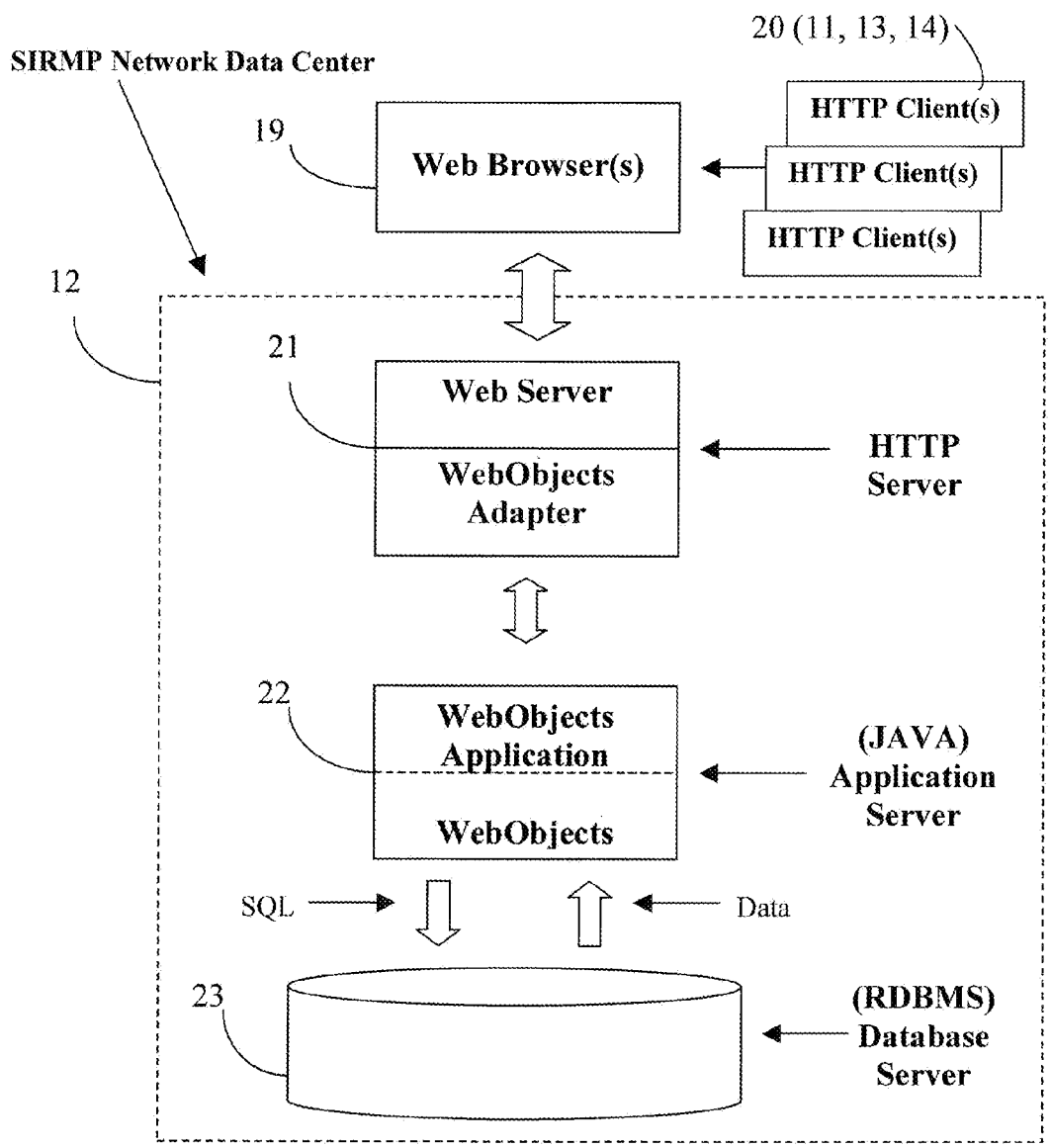
FIG. 9A is a schematic representation of a first enterprise-level Implementation of the SIRM network of FIG. 8.
Figure 9B:
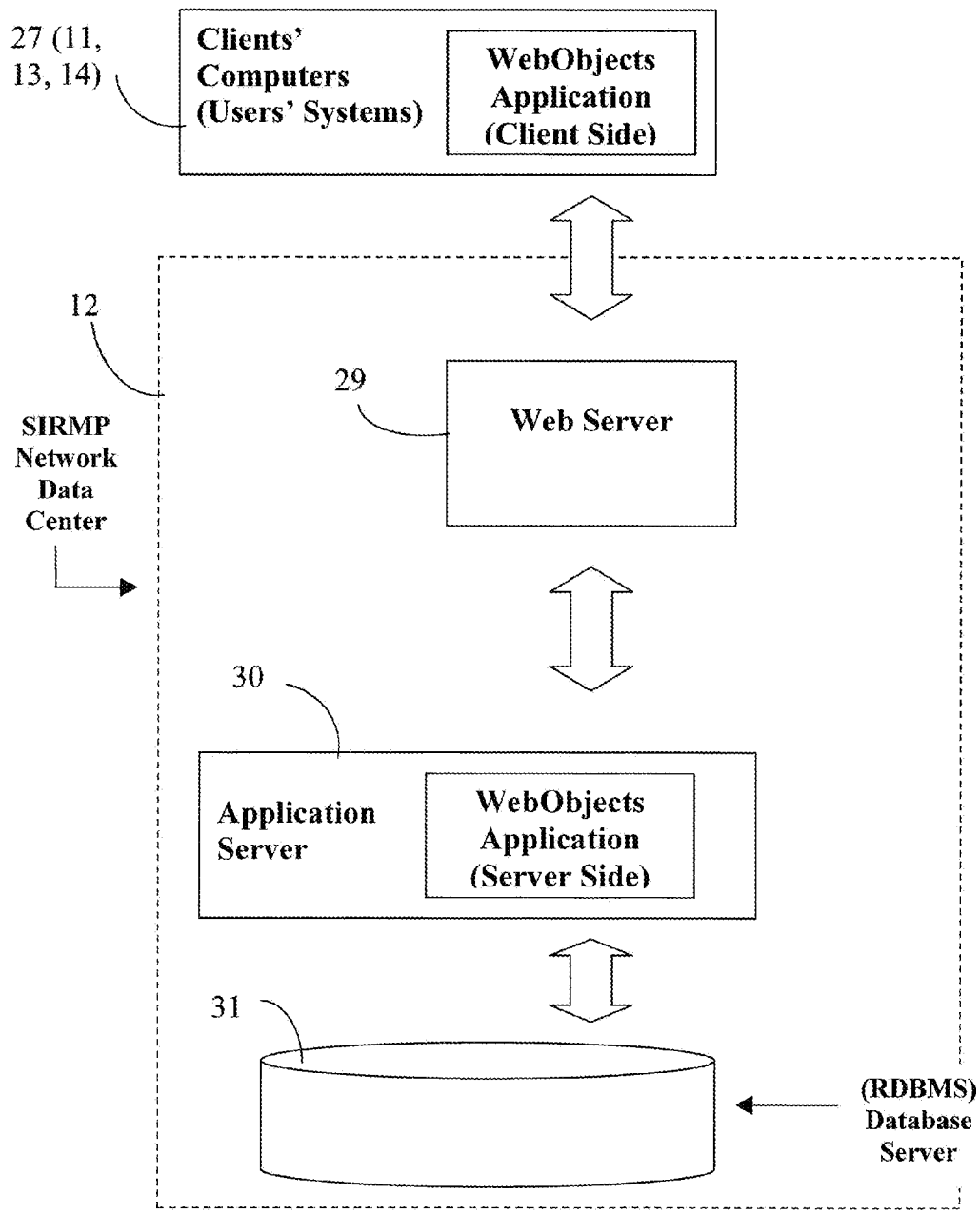
FIG. 9B is a schematic representation of a second enterprise-level implementation of the SIRM network of FIG. 8.

FIGS. 9A and 9B show two alternative implementations of the enterprise-level SIRMP Data Center 12 of FIG. 4 using the WebObjects® IDE and Java Application Server 21, 22, 29, 30, although it is understood that IDE's and server technology platforms can be used to implement and deploy server components of the SIRMP Data Center 12.

FIG. 9C is a flow chart depicting the SIRMP Security Conversion Process of FIG. 9. As indicated in Block A of FIG. 9C, a company (JPM in this example) hires an investment bank/underwriting firm to restructure its existing, outstanding equity and/or debt securities (can be one or more of its security issues). At Block B, the investment bank/underwriting firm restructures JPM's existing, outstanding equity and/or debt securities using the system and methods of the present invention (SIRMP) and separates, and withholds, from the set of equity rights of the restructured equity security, the equity right to lend (ER ($\kappa$, JPM\$)) and/or separates, and withholds, from the set of debt rights of the restructured debt security, the debt right to lend (DR ($\eta$, JPM\$))—JPM now retains the equity and/or debt right to lend its security/securities. At Block C, the investment bank/underwriting firm either returns the new equity/debt securities, less the equity and debt rights to lend ((ER ($\kappa$, JPM\$)), (DR ($\eta$, JPM\$)), to the original owners/holders or, to the company in the case of treasury stock/debt, etc. The owners/holders receive JPM stock/debt with the following equity/debt rights: (ER ($\alpha$ ... $\lambda$, JPM\$))-(ER ($\kappa$, JPM\$)) for equity securities and, (DR ($\alpha$ ... $\xi$, JPM\$))-(DR ($\eta$, JPM\$)) for debt securities. At Block D, all parties report required transactions to the various security regulators and security exchange(s).

SIRM network of the Present Invention Supporting A Corporate/Government Controlled Rights Management Exchange As shown in FIG. 10, the SIRMP corporate/government controlled rights management exchange of the present invention allows corporations, governments, government agencies, and other entities 16 to control the process through which their securities can be sold short, taking control of the short-selling process out of the hands of investors, speculators, hedgers, brokerage firms and others 13, and allowing companies, governments, or others, to assert their ability to control, manage, and profit from, the short-selling process of their own securities; the SIRMP Data Center 12 allows security issuers 16 to turn the shorting process on its head by controlling and charging for the ability to short their shares and/or debt securities. This exchange differs from that shown in FIG. 8 77, as it allows companies and governments 16 that have withheld the right(s) to lend their securities to profit by leasing those rights to potential short-sellers 13.

In the example shown in FIG. 10C, JPM (issuing company 16) has withheld prior to issuance, or repossessed via conversion, the right(s) to lend its equity securities ER ($\kappa$, JPM\$)) 42 and/or its debt securities (DR ($\kappa$, JPM\$)) 59. This allows JPM to control completely the process required to short its equity and/or debt securities, as now any party interested in selling short JPM securities must agree to terms set by JPM.

Through the SIRMP Data Center 12, JPM sets the various criteria for shorting its securities. JPM sets the lease rates (can vary by type of entity), lease periods, determines the amount of total security float to offer for short-selling, and sets any other parameters deemed important for leasing the right(s) to lend its equity and/or debt securities.

Investors, speculators, hedgers, brokerage firms and others 13 then approach the SIRMP Data Center 12 of the present invention, via the Internet 15 or other methods of communication, to ascertain the various terms on which they can short JPM securities. If one of the aforementioned parties agrees to the terms set by JPM for shorting its equity and/or debt securities, that party then remits the required money to lease the equity 42 and/or debt right(s) to lend 59 to the SIRMP Data Center 12, which distributes the money directly to JPM. This is an important process, as it allows a short-seller to maintain complete anonymity, which is something short-sellers complain about when regulations are proposed to make their processes more transparent; they argue that if a company or government knows that they have shorted, or are interested in shorting, that company's/government's securities, that company/government will not be forthcoming with information, etc. The SIRMP Data Center 12 allows short-sellers to lease the right to lend a company's/government's securities 42, 59, directly, via the SIRMP Data Center 12, from the company/government, on the company's or government's terms, but with total anonymity. More importantly, the SIRMP Data Center 12 allows JPM to manage the entire short-selling process and profit from it directly.

Because all of the short-selling transactions for JPM equity and/or debt go through the SIRMP Data Center 12, it completely precludes naked short-selling, as the SIRMP Data Center 12 is able to allocate the equity and/or debt rights to lend 42 and/or 59 JPM's securities based on JPM's criteria.

All transactions are reported, as required to the various regulatory agencies 14.

Figure 10A:
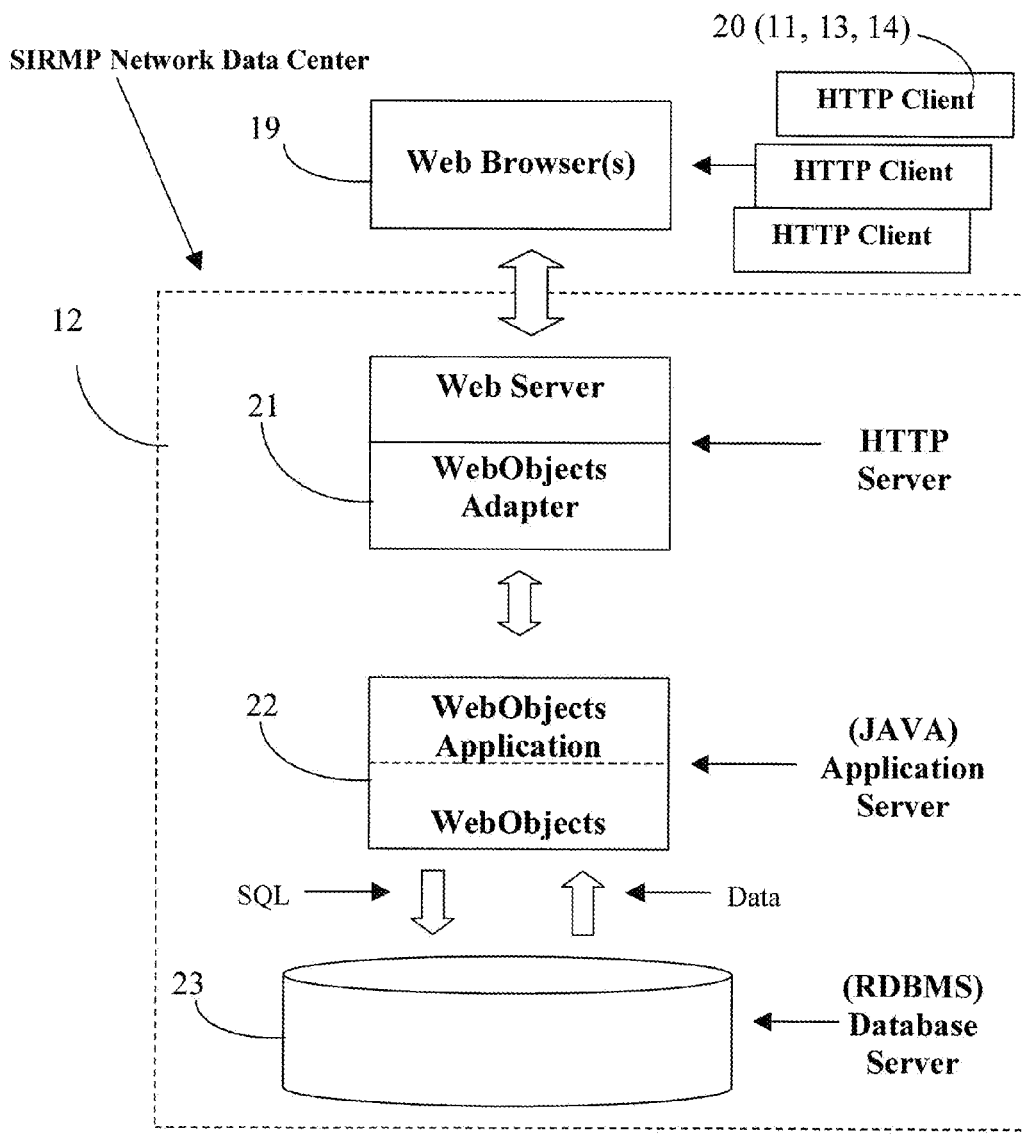
FIG. 10A is a schematic representation of a first enterprise-level implementation of the SIRM network of FIG. 9.
Figure 10B:
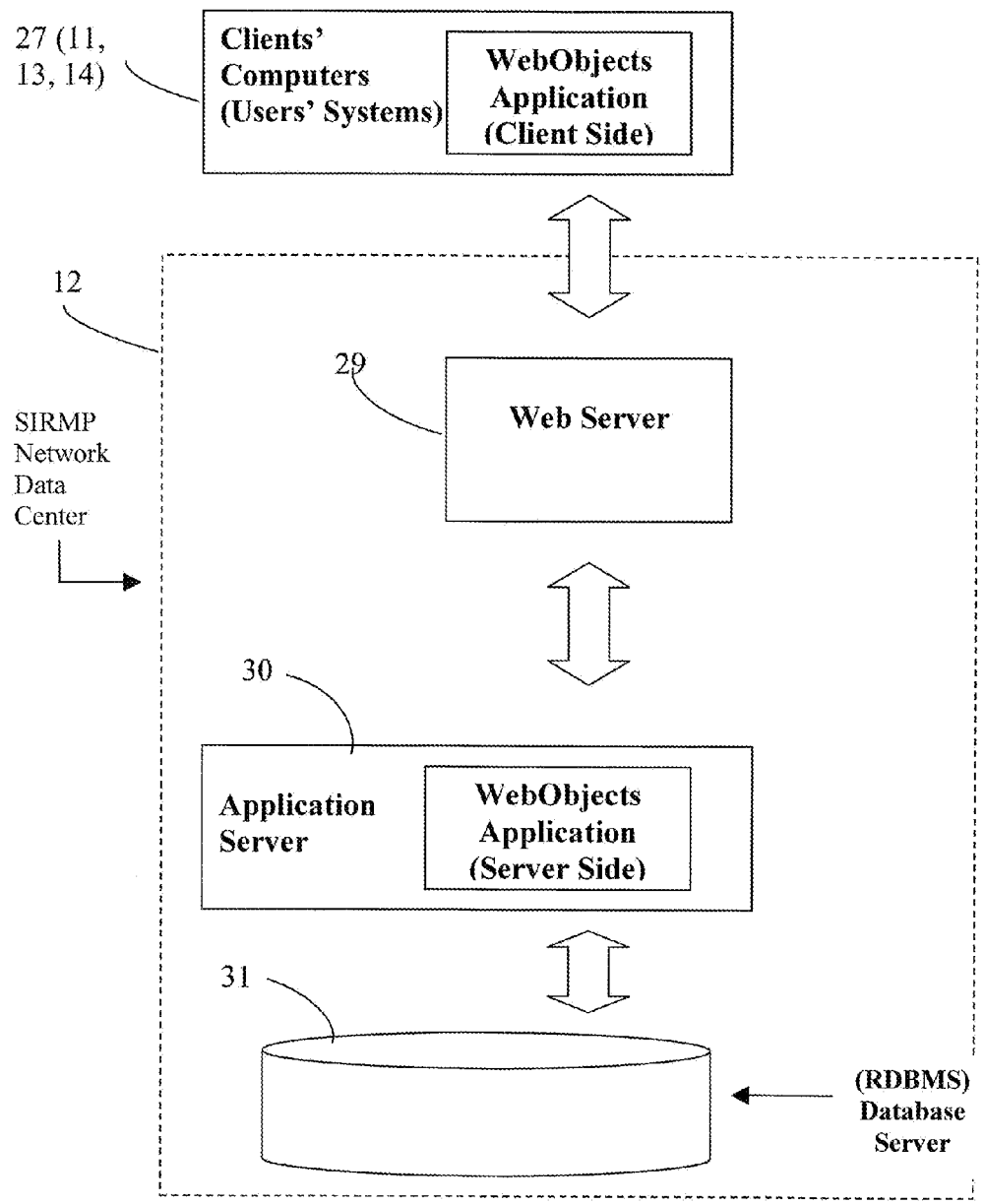
FIG. 10B is a schematic representation of a second enterprise-level implementation of the SIRM network of FIG. 9.

FIGS. 10A and 10B show two alternative implementations of the enterprise-level SIRMP Data Center 13 of FIG. 10 using the WebObjects® IDE and Java Application Server 21, 22, 29, 30, although it is understood that IDE's and server technology platforms can be used to implement and deploy server components of the SIRMP Data Center 12.

FIG. 10C is a flow chart depicting the various steps of the SIRMP Corporate/Government Controlled Rights Management Exchange depicted in FIG. 10. As indicated at Block A of FIG. 10C, a company (JPM in this example) has either withheld the right(s) to lend its equity (ER ($\kappa$, JPM$)) or debt (DR ($\eta$, JPM$)) prior to issuance, or has converted its securities to withhold those rights, so that it holds the equity and/or the debt rights to lend its securities.

At Block B, via the SIRMP, JPM sets rates for investors, speculators, hedgers, brokerage firms, and others to lease the withheld/retained right(s) to lend its equity and/or debt securities at rates that seek to optimize profit for JPM. The rate schedule may be set to escalate with increasing interest to short its equity or debt. JPM also can set limits on the amount of rights it offers to shorts and, for the time that shorts may hold these rights, by requiring the shorts to re-lease the right(s) to lend on a periodic basis. JPM controls the entire shorting process by setting the rates, amounts (by entity type, total float, other), and time periods that shorts may short its equity and debt securities. JPM can also specify different lease rates, amounts and periods based on the type of short-seller.

At Block C, the various investors, speculators, hedgers, brokerage firms, and others express their interest to short JPM's securities (equity or debt) via the SIRMP, thus assuring that the short-sellers remain anonymous to JPM. The short-seller(s) then remit(s) payment for leasing the right(s) to lend the JPM equity or debt securities to the SIRMP based on the aforementioned fee schedule determined by JPM.

At Block D, the SIRMP remits payment for the equity and debt right(s) back to JPM and reports, as required, all transactions to the proper regulatory authorities.

Also, it is understood that the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A system for implementing a security issuer rights management process (SIRMP) over a distributed communications network, and deployed in a financial marketplace involving one or more equity security issuers, one or more equity security purchasers, and one or more equity security borrowers, said system comprising:
   a data center, including one or more relational database servers (RDBMS), application servers, and web servers, interfaced with the infrastructure of said distributed communications network;
   a first networked group of computer systems for use by said one or more said equity security issuers, and being interfaced with the infrastructure of said distributed communications network, and including client machines and server machines, for supporting packet-based communications between said data center and said first networked group of computer systems;
   a second networked group of computer systems for use by said one or more equity security borrowers, and being interfaced with the infrastructure of said distributed communications network, and including client machines and server machines, for supporting packet-based communications between said data center and said second networked group of computer systems;
   wherein said data center supports the implementation of a network-level financial accounting system that recognizes and accounts for a set of equity rights possessed by said security issuer of equity securities prior to equity security issuance, and ensures that said set of equity rights is associated with non-borrowable equity securities that exclude the equity right to lend and which are offered for sale in said financial marketplace;
   wherein said equity security issuer of an equity security to be issued in said financial marketplace (i) withholds from, and prior to, an equity security issuance, the equity right to lend so as to create said non-borrowable equity security, which precludes lending of said non-borrowable equity security by said purchasers of said non-borrowable equity security and, which, can be borrowed only from said equity security issuer at lending rates set by said equity security issuer, thereby precluding the lending of said non-borrowable equity security by said equity security purchasers in said financial marketplace;
   wherein said equity security issuer uses said first networked group of computer systems to communicate with said data center via packet-based communications, to set borrowing rates and periods for said non-borrowable equity security held by said equity security purchasers;
   wherein said equity security borrower uses said second networked group of computer systems to communicate with said data center via packet communications, and (i) requests from said equity security issuer, the equity right to lend for said non-borrowable equity security pursuant to said borrowing rates and periods set by said equity security issuer, (ii) accepts said borrowing rates and periods set by said equity security issuer, and (iii) receives said equity right to lend associated with said non-borrowable equity security, from said equity security issuer, via said data center, so that said equity security borrower can borrow said non-borrowable equity security from said equity security issuer for the purpose of selling said non-borrowable equity security short in said financial marketplace; and
   wherein said data center automatically accounts for the allocation of said borrowed equity right to lend associated with said non-borrowable equity security, and payment of said borrowing rates agreed to between said equity security issuer and said equity security borrower.

2. The system of claim 1, wherein each said first and second group of networked computer systems comprises relational database servers (RDBMSs), application servers, and web servers, and client machines supporting graphical user interfaces (GUIs).

3. The system of claim 1, wherein said distributed communications network comprises the Internet supporting TCP/IP.

4. The system of claim 1, wherein said equity security issuers comprise one or more equity-issuing companies.

5. The system of claim 1, wherein issuers of equity securities are afforded the opportunity to withhold and/or transfer the equity right to lend which they possess prior to security structuring and issuance or, after security restructuring/conversion, so as to optimize profit from, and to manage, the lending/borrowing and, thus, short-selling of their equity securities.

6. The system of claim 1, wherein issuers of equity securities are afforded the opportunity to collect security borrowing revenue from short-term or high-frequency traders, who currently avoid paying for a security borrow by closing a position within the required T+3 location and settlement period and thus avoid the actual location and borrow of a security, by requiring all security borrowing to be sourced through the equity security issuers that have withheld the equity right to lend which facilitates immediate location and borrowing of said equity securities.

7. The system of claim 1, which further comprises a third networked group of computer systems for use by government regulatory agencies, and being interfaced with the infrastructure of said distributed communications network, and including client machines and server machines, for supporting communications between said data center and said third networked group of computer systems; and wherein said government regulatory agencies use said third networked group of computer systems to communicate with said data center via packet-based communications, for the purpose of overseeing said equity security issuers and said equity security borrowers in said financial marketplace.

8. The system of claim 1, wherein equity security issuers are able to withhold, prior to structuring and issuance or, after structuring and issuance via restructuring/conversion, the individual right to lend equity securities, so as to preclude borrowing and, thus, short-selling of said equity securities.

9. The system of claim 1, wherein said equity security issuers are able to restructure existing, outstanding equity securities through a controlling equity interest, or through a proxy shareholder vote to gain a controlling equity interest, to withhold the individual right to lend equity securities so as to preclude borrowing and, thus, short-selling of their equity securities.

10. The system of claim 1, whereby a long-only equity security is created by an equity security issuer by permanently withholding the equity right to lend prior to the issuance of an equity security.

11. A system for implementing a security issuer rights management process (SIRMP) over a distributed computer network having an infrastructure, and deployed in a financial marketplace involving one or more debt security issuers, one or more debt security purchasers, and one or more debt security borrowers, said system comprising:
   a data center, including one or more relational database servers (RDBMS), application servers, and web servers, interfaced with the infrastructure of said distributed communications network;
   a first networked group of computer systems for use by said one or more said debt security issuers, and being interfaced with the infrastructure of said distributed communications network, and including client machines and server machines, for supporting packet-based communications between said data center and said first networked group of computer systems; and
   a second networked group of computer systems for use by said one or more debt security borrowers, and being interfaced with the infrastructure of said distributed communications network, and including client and server machines, for supporting packet-based communications between said data center and said second networked group of computer systems;
   wherein said data center supports the implementation of a network-level financial accounting system that recognizes and accounts for a set of debt rights possessed by said debt security issuer of debt securities prior to debt security issuance, and ensures that said set of debt rights is associated with non-borrowable debt securities that exclude the debt right to lend and which are offered for sale in said financial marketplace;
   wherein said debt security issuer of a debt security to be issued in said financial marketplace (i) withholds from, and prior to, a debt security issuance, the debt right to lend so as to create said non-borrowable debt security, which precludes lending of said non-borrowable debt security by said purchasers of said non-borrowable debt security and, which, can be borrowed only from said debt security issuer at lending rates set by said debt security issuer, thereby precluding the lending of said non-borrowable debt security by said debt security purchasers in said financial marketplace;
   wherein said debt security issuer uses said first networked group of computer systems to communicate with said data center via packet-based communications, to set borrowing rates and periods for said non-borrowable debt security held by said debt security purchasers;
   wherein said debt security borrower uses said second networked group of computer systems to communicate with said data center via packet-based communications, and (i) requests from said debt security issuer, the debt right to lend for said non-borrowable debt security pursuant to said borrowing rates and periods set by said debt security issuer, (ii) accepts said borrowing rates and periods set by said debt security issuer, and (iii) receives said debt right to lend associated with said non-borrowable debt security, from said debt security issuer, via said data center, so that said debt security borrower can borrow said non-borrowable debt security from said debt security issuer for the purpose of selling said non-borrowable debt security short in said financial marketplace; and
   wherein said data center automatically accounts for the allocation of said borrowed debt right to lend associated with said non-borrowable debt security, and payment of said borrowing rates agreed to between said debt security issuer and said debt security borrower.

12. The system of claim 11, wherein each said first and second group of networked computer systems comprises relational database servers (RDBMSs), application servers, and web and other communication servers, and client machines supporting graphical user interfaces (GUI) interfaces.

13. The system of claim 11, wherein said distributed communications network comprises the Internet supporting TCP/IP.

14. The system of claim 11, wherein said debt security issuers comprise one or more debt-issuing companies, debt-issuing governments or government agencies, or other debt-issuing entities.

15. The system of claim 11, wherein issuers of debt securities are afforded the opportunity to withhold and/or transfer the debt right to lend which they possess prior to security structuring and issuance or, after security restructuring/conversion, so as to optimize profit from, and to manage, the lending/borrowing and, thus, short-selling of their debt securities.

16. The system of claim 11, wherein issuers of debt securities are afforded the opportunity to collect security borrowing revenue from short-term or high-frequency traders, who currently avoid paying for a security borrow by closing a position within the required T+3 location and settlement period and thus avoid the actual location and borrow of a security, by requiring all security borrowing to be sourced through the debt security issuers that have withheld the debt right to lend which facilitates immediate location and borrowing of said debt securities.

17. The system of claim 11, which further comprises a third networked group of computer systems for use by said government regulatory agencies, and being interfaced with the infrastructure of said distributed communications network, and including client machines and server machines, for supporting communications between said data center and said third networked group of computer systems; and wherein said government regulatory agencies use said third networked group of computer systems to communicate with said data center via packet-based communications, for the purpose of overseeing said equity security issuers and said equity security borrowers in said financial marketplace.

18. The system of claim 11, wherein debt security issuers are able to withhold, prior to structuring and issuance, or after structuring and issuance via restructuring/conversion, the individual right to lend debt securities so as to preclude borrowing and, thus, short-selling of said debt securities.

19. The system of claim 11, wherein debt security issuers are able to restructure existing, outstanding debt securities through a controlling debt interest, or through a proxy debt holder vote to gain a controlling debt interest, to withhold the individual right to lend debt securities so as to preclude borrowing and, thus, short-selling of their debt securities.

20. The system of claim 11, whereby all debt security lending revenue is distributed across a debt security issuer's entire debt holder base in the form of a new/increased coupon payment, a debt repurchase program, or through early payment of outstanding corporate debt.

21. A system for implementing a security issuer rights management process (SIRMP) over a distributed communications network, and deployed in a financial marketplace involving one or more security issuers, one or more security purchasers, and one or more security borrowers, said system comprising:

a data center, including one or more relational database servers (RDBMS), application servers, and web servers, interfaced with the infrastructure of said distributed communications network;

a first networked group of computer systems for use by said one or more said security issuers, and being interfaced with the infrastructure of said distributed communications network, and including client machines and server machines, for supporting communications between said data center and said first networked group of computer systems;

a second networked group of computer systems for use by said one or more security borrowers, and being interfaced with the infrastructure of said distributed communications network, and including client machines and server machines, for supporting communications between said data center and said second networked group of computer systems;

wherein said data center supports the implementation of a network-level financial accounting system that recognizes and accounts for a set of rights possessed by said security issuer of securities prior to security issuance, and ensures that said set of rights is associated with non-borrowable securities that exclude the right to lend and which are offered for sale in said financial marketplace;

wherein said security issuer of a security to be issued in said financial marketplace (i) withholds from, and prior to, a security issuance, the right to lend so as to create said non-borrowable security, which precludes lending of said non-borrowable security by said purchasers of said non-borrowable security and, which, can be borrowed only from said security issuer at lending rates set by said security issuer, thereby precluding the lending of said non-borrowable security by said security purchasers in said financial marketplace;

wherein said security issuer uses said first networked group of computer systems to communicate with said data center, to set borrowing rates and periods for said non-borrowable security held by said security purchasers;

wherein said security issuer uses said second networked group of computer systems to communicate with said data center, and (i) establishes a security lending right lease or purchase rate schedule for the right to lease or purchase the right to lend said non-borrowable security pursuant to regulatory approval from overseeing government regulatory agencies and (ii) enables said security borrower to lease or buy the right to lend associated with said non-borrowable security at a price established by said security issuer, and make payment to said security issuer for the leased or purchased right to lend associated with said non-borrowable security; and wherein said data center automatically accounts for (i) the allocation of said leased or purchased security right to lend associated with said non-borrowable security, and (ii) the payment associated with said leased or purchased security right to lend associated with said non-borrowable security and agreed to between said security issuer and said security borrower.

22. The system of claim 21, wherein each said first and second group of networked computer systems comprises relational database servers (RDBMSs), application servers, and web servers, and client machines supporting graphical user interfaces (GUIs).

23. The system of claim 21, wherein said distributed communications network comprises the Internet supporting TCP/IP.

24. The system of claim 21, wherein said security issuers comprise one or more of equity-security issuing entities or debt-issuing entities.

25. The system of claim 21, wherein issuers of securities are afforded the opportunity to withhold and/or transfer the right to lend which they possess prior to security structuring and issuance or, after security restructuring/conversion, so as to optimize profit from, and to manage, the lending/borrowing and, thus, short-selling of their securities.

26. The system of claim 21, wherein issuers of securities are afforded the opportunity to collect security borrowing revenue from short-term or high-frequency traders, who currently avoid paying for a security borrow by closing a position within the required T+3 location and settlement period and thus avoid the actual location and borrow of a security, by requiring all security borrowing to be sourced through the security issuers that have withheld the right to lend which facilitates immediate location and borrowing of said securities.

27. The system of claim 21, which further comprises a third networked group of computer systems for use by government regulatory agencies, and being interfaced with the infrastructure of said distributed communications network, and including client machines and server machines, for supporting communications between said data center and said third networked group of computer systems; and wherein said government regulatory agencies use said third networked group of computer systems to communicate with said data center via communications, for the purpose of overseeing said security issuers and said security borrowers in said financial marketplace.

28. The system of claim 21, wherein security issuers are able to withhold, prior to structuring and issuance or, after structuring and issuance via restructuring/conversion, the individual right to lend securities, so as to preclude borrowing and, thus, short-selling of said securities.

29. The system of claim 21, wherein said security issuers are able to restructure existing, outstanding securities through a controlling interest, or through a proxy shareholder vote to gain a controlling interest, to withhold the individual right to lend securities so as to preclude borrowing and, thus, short-selling of their securities.

30. The system of claim 21, whereby a long-only security is created by a security issuer by permanently withholding the right to lend prior to the issuance of a security.

* * * * *